United States Patent
Chen et al.

(10) Patent No.: US 11,126,060 B2
(45) Date of Patent: Sep. 21, 2021

(54) TUNABLE LIGHT PROJECTOR

(71) Applicant: LIQXTAL TECHNOLOGY INC., Tainan (TW)

(72) Inventors: Hung-Shan Chen, Tainan (TW); Ming-Syuan Chen, Tainan (TW)

(73) Assignee: LIQXTAL TECHNOLOGY INC., Tainan (TW)

( * ) Notice: Subject to any disclaimer, the term of this patent is extended or adjusted under 35 U.S.C. 154(b) by 0 days.

(21) Appl. No.: 16/371,127

(22) Filed: Apr. 1, 2019

(65) Prior Publication Data

US 2019/0258134 A1  Aug. 22, 2019

Related U.S. Application Data

(63) Continuation-in-part of application No. 16/044,484, filed on Jul. 24, 2018.
(Continued)

(51) Int. Cl.
*G02F 1/29* (2006.01)
*G01S 7/481* (2006.01)
*G01S 17/42* (2006.01)

(52) U.S. Cl.
CPC .............. *G02F 1/29* (2013.01); *G01S 7/4814* (2013.01); *G01S 17/42* (2013.01); *G02F 1/294* (2021.01); *G02F 2201/122* (2013.01)

(58) Field of Classification Search
CPC .. G02F 1/292; G02F 1/1334; G02F 1/134309; G02F 1/134363;
(Continued)

(56) References Cited

U.S. PATENT DOCUMENTS 5,825,448 A  10/1998  Bos et al.
7,058,252 B2  6/2006  Woodgate et al.
(Continued)

FOREIGN PATENT DOCUMENTS

CN  86104605  7/1987
CN  1732520  2/2006
(Continued)

OTHER PUBLICATIONS

"Office Action of Taiwan Counterpart Application", dated May 8, 2019, p. 1-p. 7.
(Continued)

*Primary Examiner* — Angela K Davison
(74) *Attorney, Agent, or Firm* — JCIPRNET

(57) ABSTRACT

A tunable light projector including a light source, a fixed optical phase modulator, a tunable liquid crystal panel, and a driver is provided. The light source is configured to emit a light beam. The fixed optical phase modulator is disposed on a path of the light beam and configured to modulate phases of the light beam. The tunable liquid crystal panel is disposed on the path of the light beam from the fixed optical phase modulator and configured to switch the light beam between a structured light and a flood light. The driver is electrically connected to a first electrode layer and a second electrode layer of the tunable liquid crystal panel and configured to change a voltage difference between the first electrode layer and the second electrode layer, so as to switch the light beam between the structured light and the flood light.

17 Claims, 23 Drawing Sheets

Related U.S. Application Data

(60) Provisional application No. 62/804,757, filed on Feb. 13, 2019, provisional application No. 62/566,538, filed on Oct. 2, 2017.

(58) Field of Classification Search
CPC ......... G02F 1/133707; G02F 2001/294; G02F 2001/134372; G02F 2001/133757; G02F 2201/305; G02F 2201/122; G02F 2201/124; G02F 2201/121; G02F 2201/123; G02B 5/1814; G02B 5/1866; G02B 27/42; G02B 27/4205; G02B 27/4235; G02B 30/27; G02B 30/30; H04N 13/307; H04N 13/349; H04N 13/356; H04N 13/359; H04N 13/31; H04N 13/305
See application file for complete search history.

(56) References Cited

U.S. PATENT DOCUMENTS

| | | | |
|---|---|---|---|
| 7,388,679 B2 | 6/2008 | Yoshino et al. | |
| 8,224,133 B2 | 7/2012 | Popovich et al. | |
| 9,081,239 B2 | 7/2015 | Kataoka et al. | |
| 9,325,973 B1 | 4/2016 | Hazeghi et al. | |
| 9,488,877 B2 | 11/2016 | Wu | |
| 9,826,216 B1* | 11/2017 | Hazeghi | G02B 27/30 |
| 2010/0091354 A1* | 4/2010 | Nam | H04N 13/32 359/298 |
| 2012/0075569 A1 | 3/2012 | Chang et al. | |
| 2012/0147059 A1* | 6/2012 | Chen | G02B 30/27 345/690 |
| 2014/0240642 A1* | 8/2014 | Furukawa | G02F 1/133606 349/65 |
| 2015/0271482 A1* | 9/2015 | Chen | G02F 1/134309 349/65 |
| 2017/0038647 A1* | 2/2017 | Wang | G02F 1/134336 |
| 2018/0062097 A1* | 3/2018 | Toko | G02F 1/133345 |

FOREIGN PATENT DOCUMENTS

| | | |
|---|---|---|
| CN | 1892338 | 1/2007 |
| CN | 101339345 | 1/2009 |
| CN | 101968595 | 2/2011 |
| CN | 201903664 | 7/2011 |
| CN | 102822717 | 12/2012 |
| CN | 103605202 | 2/2014 |
| CN | 105675150 | 6/2016 |
| CN | 108332082 | 7/2018 |
| CN | 108828786 | 11/2018 |
| CN | 109459849 | 3/2019 |
| JP | 2000275653 | 10/2000 |
| TW | 201224515 | 6/2012 |
| TW | 201423236 | 6/2014 |
| TW | 201531730 | 8/2015 |
| TW | I569040 | 2/2017 |

OTHER PUBLICATIONS

"Office Action of Taiwan Counterpart Application", dated Feb. 6, 2020, p. 1-p. 9.
"Office Action of China Related Application, application No. 201811136702.7", dated Apr. 2, 2020, p. 1-p. 11.
"Office Action of China Counterpart Application", dated Aug. 24, 2020, p. 1-p. 8.
"Office Action of China Related Application, application No. 201811136702.7", dated Jan. 7, 2021, p. 1-p. 12.
"Office Action of Taiwan Related Application, application No. 109111125", dated Jan. 7, 2021, p. 1-p. 6.
"Office Action of Taiwan Counterpart Application", dated Mar. 23, 2021, p. 1-p. 10.

\* cited by examiner

TUNABLE LIGHT PROJECTOR

CROSS-REFERENCE TO RELATED APPLICATION

This application is a continuation-in-part application of and claims the priority benefit of U.S. application Ser. No. 16/044,484, filed on Jul. 24, 2018, which claims the priority benefit of U.S. provisional application Ser. No. 62/566,538, filed on Oct. 2, 2017. This application also claims the priority benefit of U.S. provisional application Ser. No. 62/804,757, filed on Feb. 13, 2019. The entirety of each of the above-mentioned patent applications is hereby incorporated by reference herein and made a part of this specification.

BACKGROUND

Technical Field

The invention generally relates to a sensing device and a light projector, and, in particular, to an optical sensing device, a structured light projector, and a tunable light projector.

Description of Related Art

At present, the mainstream technology in the field of 3-dimension (3D) sensing is divided into time of flight (TOF) and structured illumination. The TOF technology uses pulsed laser and complementary metal-oxide-semiconductor (CMOS) sensor to calculate the distance based on a measured reflection time. Due to the structure and costs, TOF 3D sensing is generally more suitable for resolving objects at long distance. In structured illumination, infrared source projects IR light onto a diffractive optical element (DOE) to produce 2D diffraction patterns, while a sensor is used to collect the reflected light. The distance of an object in 3-dimension can then be calculated using triangulation method. Structured illumination is limited by having projection lens with fixed focal length, which limits the distance that a clear and focused diffraction pattern are able to form, ultimately limiting the distance of an object that is resolvable to be within a small range.

To solve the foregoing problem of structured illumination, adding apodized lens to the lens group in order to produce a multifocal system was proposed. However, such a method comes at the expense of light efficiency, 2D diffraction pattern points and resolution.

Moreover, in the 3D face recognition of a mobile device, both a flood light system and a structured light system are used to achieve 3D face recognition. The flood light system is first used to determine whether an approaching object is a human face. If the approaching object is a human face, the structured light system is then started and used to determine whether the detected human face is the face of a user of the mobile device. However, adopting two systems, i.e. the flood light system and the structured light system, in a mobile device may occupy large space and be costly.

SUMMARY

The invention provides an optical sensing device which uses liquid crystal to control the focus of a structured light.

The invention provides a structured light projector which uses liquid crystal to control the focus of a structured light.

The invention provides a tunable light projector which uses a tunable liquid crystal panel to switch the light beam between a structured light and a flood light.

According to an embodiment of the invention, an optical sensing device adapted to detect an object or features of the object is provided. The optical sensing device includes a structured light projector and a sensor. The structured light projector is configured to project a structured light to the object. The structured light projector includes a light source, a diffractive optical element (DOE), and a liquid crystal lens module. The light source is configured to emit a light beam. The diffractive optical element is disposed on a path of the light beam and configured to generate diffraction patterns so as to form the structured light. The liquid crystal lens module is disposed on at least one of the path of the light beam and a path of the structured light and capable of controlling between at least two focusing state. The sensor is disposed adjacent to the structured light projector and configured to sense a reflected light. The reflected light is reflection of the structured light from the object.

According to an embodiment of the invention, a structured light projector is provided. The structured light projector includes a light source, a diffractive optical element, and a liquid crystal lens module. The light source is configured to emit a light beam. The diffractive optical element is disposed on a path of the light beam and configured to generate diffraction patterns so as to form the structured light. The liquid crystal lens module is disposed on at least one of the path of the light beam and a path of the structured light and capable of controlling between at least two focusing state.

According to an embodiment of the invention, a tunable light projector including a light source, a fixed optical phase modulator, a tunable liquid crystal panel, and a driver is provided. The light source is configured to emit a light beam. The fixed optical phase modulator is disposed on a path of the light beam and configured to modulate phases of the light beam. The tunable liquid crystal panel is disposed on the path of the light beam from the fixed optical phase modulator and configured to switch the light beam between a structured light and a flood light. The tunable liquid crystal panel includes a first substrate, a second substrate, a liquid crystal layer, a first electrode layer, and a second electrode layer. The liquid crystal layer is disposed between the first substrate and the second substrate. At least one of the first electrode layer and the second electrode layer is a patterned layer. The first electrode layer and the second electrode are both disposed on one of the first substrate and the second substrate, or are respectively disposed on the first substrate and the second substrate. The driver is electrically connected to the first electrode layer and the second electrode layer and configured to change a voltage difference between the first electrode layer and the second electrode layer, so as to switch the light beam between the structured light and the flood light.

Base on the above, the structured light projector according to some embodiments includes at least one liquid crystal lens module with variable focal length. Having the liquid crystal lens module with variable focal length in the structured light projector increase the range of projected structured being in focus. Furthermore, a small optical sensor using the above structured light projector may be obtained. In the tunable light projector according to the embodiment of the invention, a tunable liquid crystal panel is adopted to switch a light beam between a structured light and a flood light, so that the embodiment of the invention integrates a flood light system and a structured light system into a single system, which reduces the cost and the volume of an electronic device having structured light and flood light functions.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
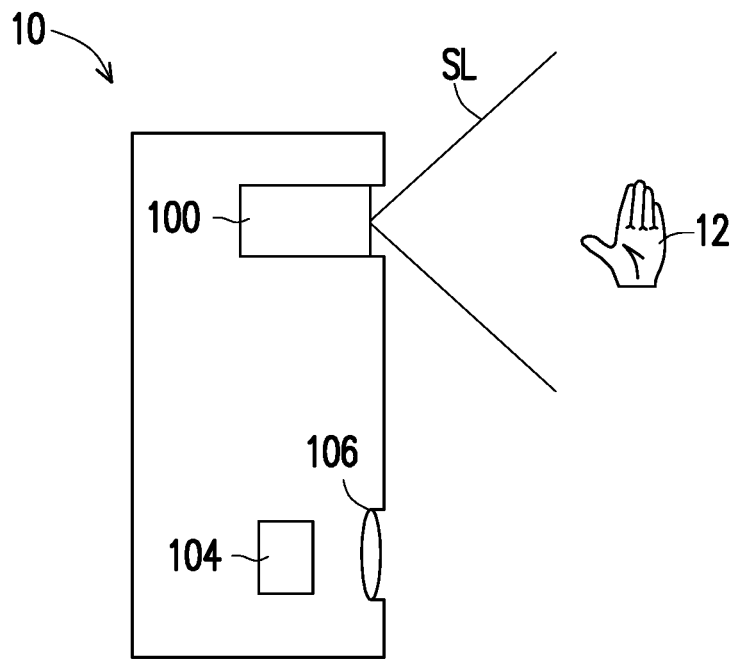
FIG. 1 is a schematic diagram of an optical sensing device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Further, spatially relative terms, such as "underlying", "below", "lower", "overlying", "upper", "top", "bottom", "left", "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a schematic cross-sectional view of an optical sensing device 10 according to an embodiment of the invention. The optical sensing device 10 shown in FIG. 1 is a sensing device which uses structured light to detect an object. More specifically, the optical sensing device 10 includes a structured light projector 100 and a sensor 104 disposed adjacent to the structured light projector 100. The structured light projector 100 is configured to generate a structured light SL towards an object 102, and a sensor 104 is configured to sense the structured light SL reflected from the object 102. The structured light may include, but are not limited to, multiple light beams that project a light pattern such as a series of lines, circles, dots or the like, to an object 102, wherein the lines, circles, dots or the like may or may not be arranged in an ordered manner. The object 102 may be, for example, a hand, a human face or any other objects that have 3D features. When the structured light SL is projected on the object 102, the light pattern of the structured light SL may deform due to the concave-convex surface of the object 102. The deformed structured light SL is then reflected from object 102, the reflected light passes through an opening 106 before reaching sensor 104. The opening 106 includes, for example, a lens, an aperture, a transparent cover or the like. The sensor 104 senses the deformation of the light pattern on the object 102 so as to calculate the depths of the surface of the object 12, i.e. distances from points on the object 102 to the sensors 104. Sensor 104 may be connected to a processor (not shown) to calculate the 3-dimensional feature of the object 102.

Figure 2:
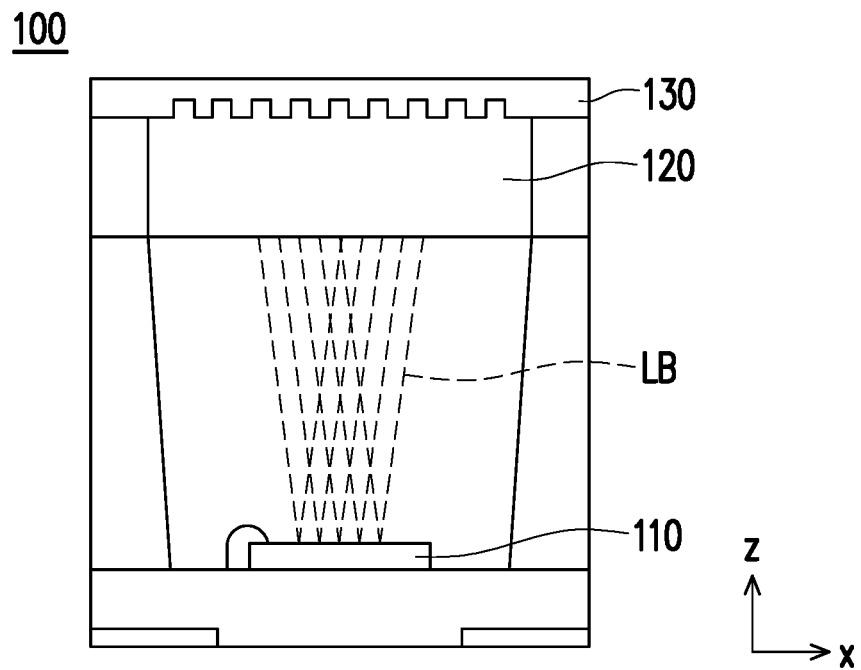
FIG. 2 is a schematic cross-sectional view of a structured light projector of FIG. 1.

FIG. 2 is a cross-sectional diagram of a structured light projector 100 according to an embodiment of the invention. The structured light projector 100 shown includes a light source 110, a liquid crystal lens module 120 and a diffractive optical element (DOE) 130. The light source 110 disposed on one end of the structured light projector 100 is configured to emit a light beam LB. The light source 110 may be a light emitting device (LED), laser diode, an edge emitting laser, a vertical-cavity surface-emitting laser (VCSEL) or any other suitable light source capable of emitting a visible or non-visible (e.g. infrared (IR) or ultraviolet (UV)) light beam LB. In some embodiments, the light source 110 may be a single IR laser diode, in some other embodiments the light source 110 may be an array of IR laser diode, the number of light source forming light source 110 is not limited.

The structured light projector 100 further includes a liquid crystal lens module 120 disposed on the path of light beam LB. The liquid crystal lens module 120 is capable of controlling the focusing states of the light beam LB and provide at least two focusing state to the structured light projector 100. Optionally, a polarizer (not shown) may be placed on the path of the light beam LB before the liquid crystal lens module 120 to provide liquid crystal lens module 120 with a polarized (e.g. linear polarized or circular polarized) light beam LB.

In FIG. 2, the diffractive optical element 130 is shown to be disposed on the path of the light beam LB after liquid crystal lens module 120, however the order of placement of diffractive optical element 130 and liquid crystal lens module 120 is not limited. In some embodiments, the diffractive optical element 130 may be disposed on the path of the light beam LB before liquid crystal lens module 120. In some embodiments, the diffractive optical element 130 may even be disposed between elements of liquid crystal lens module 120 on the path of the light beam LB. The diffractive optical element 130 is an optical element configured to generate diffraction patterns in order to generate the structured light SL as described above with reference to FIG. 1. For example, the diffractive optical element 130 may contain patterns that splits the light beam LB into multiple dots, or shape the light beam into gridlines, but is not limited thereto. For simplicity, the light beam LB after passing diffractive optical element 130 will henceforth be referred to as structured light SL. Furthermore, for ease of description, mutually orthogonal x-direction and z-direction is provided. For example, in the present embodiment, the z-direction is defined as the direction perpendicular to the light emitting surface of the light source 110.

Figure 3A:
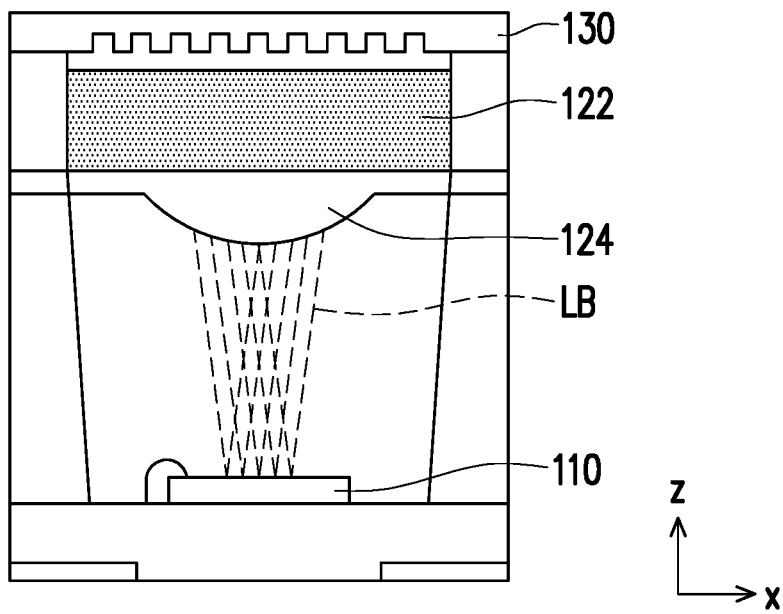
FIGS. 3A-3C are schematic cross-sectional views of another structured light projector according to at least one embodiment of the invention.
Figure 3B:
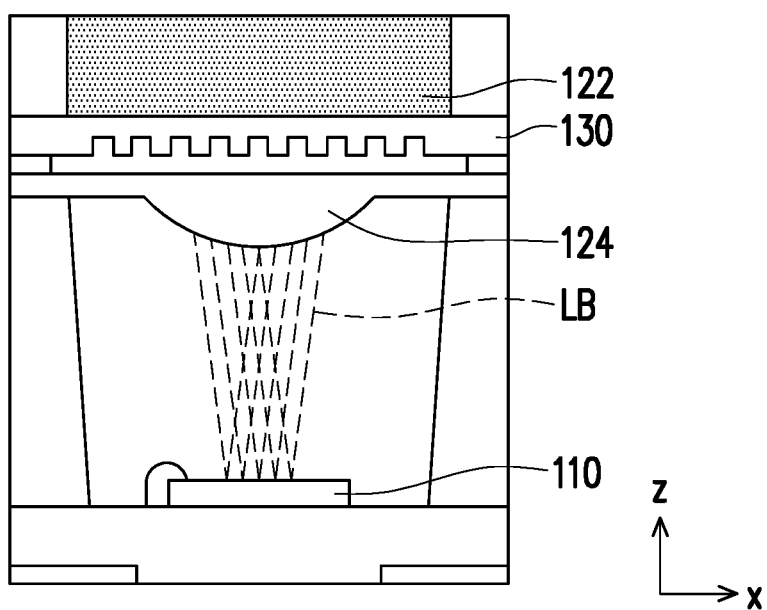
Figure 3C:
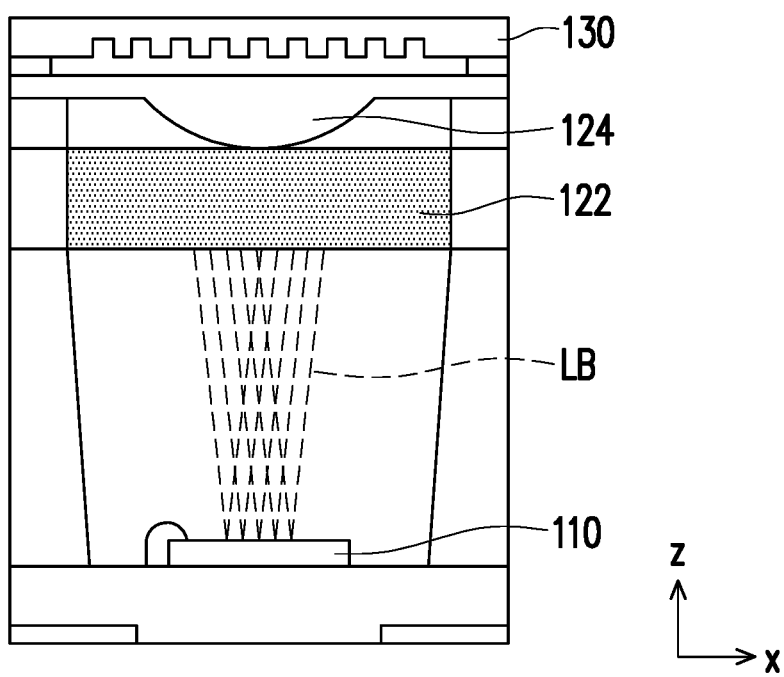

FIG. 3A-3C show schematic cross-sectional views of variations of structured light projectors 200a-200c according to some embodiments of the invention. Structured light projectors 200a-200c are similar to structured light projector 100 shown in FIG. 2. The difference between structured light projectors 200a-200c and structured light projector 100 lies in that structured light projectors 200a-200c include a liquid crystal lens cell 122 and a solid lens 124 while omitting liquid crystal lens module 120. In some embodiment, the combination of liquid crystal lens cell 122 and solid lens 124 may also be regarded as liquid crystal lens module 120 of FIG. 2.

Referring to FIG. 3A, the solid lens 124 is disposed on the path of the light beam LB between the diffractive optical element 130 and the light source 110, and the liquid crystal lens cell 122 is disposed on the path of the light beam LB between solid lens 124 and diffractive optical element 130. In FIG. 3B, the solid lens 124 is disposed on the path of the light beam LB between the diffractive optical element 130 and the light source 110, and the liquid crystal lens cell 122 is disposed on the side of diffractive optical element 130 away from the light source. In other words, liquid crystal lens cell 122 is disposed on the path of the structured light SL. In FIG. 3C, the solid lens 124 is disposed on the path of the light beam LB between the diffractive optical element 130 and the light source 110, and the liquid crystal lens cell 122 is disposed on the path of the light beam LB between solid lens 124 and light source 110.

In some embodiments, solid lens 124 may be a single lens or a multiple lens group that determines the primary focal length of the structured light projector 200a. In some embodiments, solid lens 124 collimates the light beam LB before light beam LB enters liquid crystal lens cell 122 or diffractive optical element. In some embodiments, the liquid crystal lens cell 122 has a variable focal length and includes least one liquid crystal cell layer. The focal length of the liquid crystal lens cell 122 is controlled by controlling the orientation of the liquid crystal molecules (not shown) in the liquid crystal lens cell 122 by application of external electric field.

FIG. 4A-8 disclose some embodiment of liquid crystal lens module which may be used as liquid crystal lens module 120 of FIG. 2. In some embodiments, liquid crystal lens module disclosed in FIG. 4A-8 may be used as liquid crystal lens cell 122 of FIGS. 3A-3C and the invention is not limited thereto.

Figure 4A:
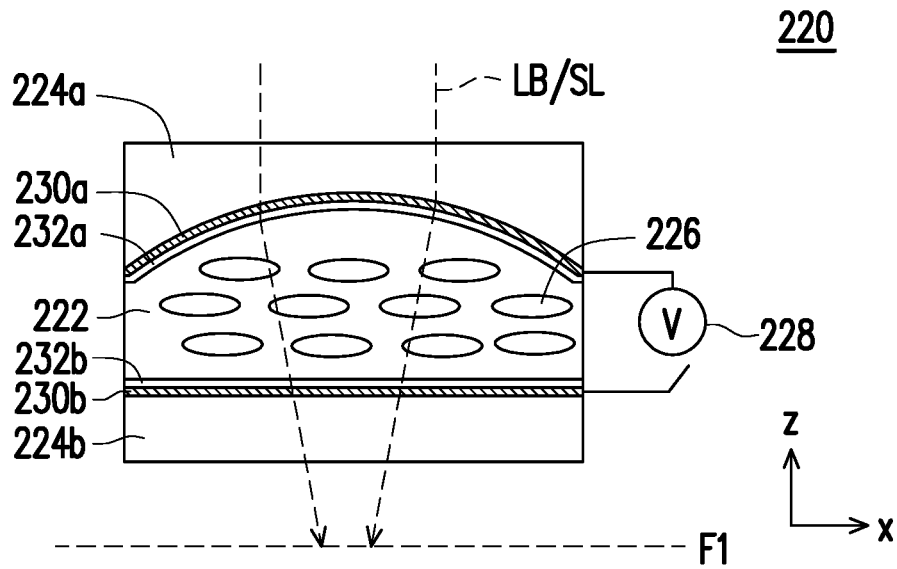
FIGS. 4A-4B are schematic cross-sectional views of various liquid crystal lens modules of FIG. 2 under two different states according to at least one embodiment of the invention.
Figure 4B:
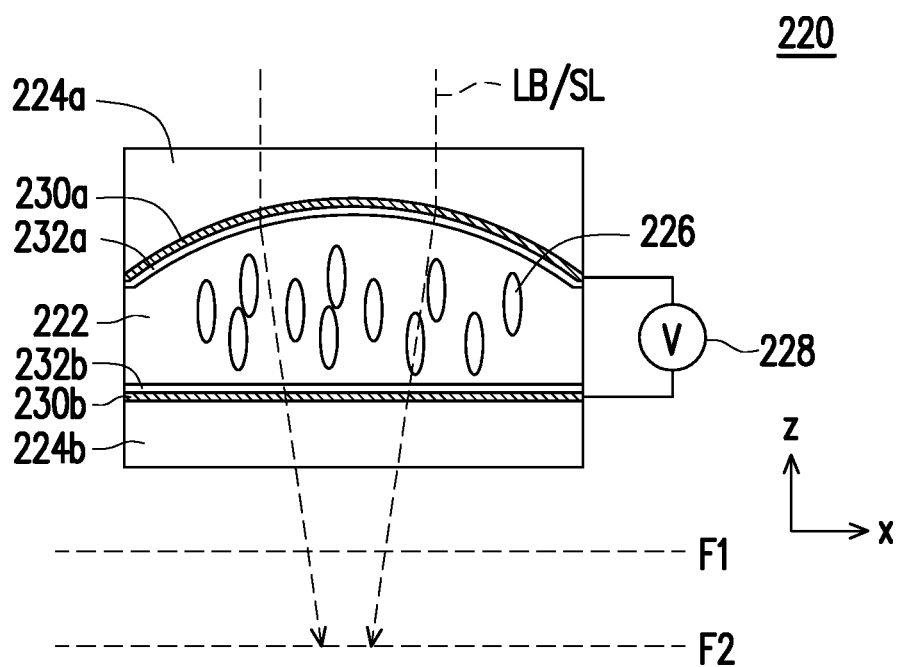

FIGS. 4A and 4B are schematic cross-sectional views of liquid crystal lens module 220 according to an embodiment of the invention. The liquid crystal lens module 220 includes a first substrate 224a, a second substrate 224b, and a liquid crystal layer 222. The liquid crystal layer 222 is sandwiched between the first substrate 224a and the second substrate 224b in the vertical z-direction. An effective refractive index of each position on the liquid crystal layer 222 is related to a voltage applied on a first electrode 230a and a second electrode 230b, wherein the first electrode 230a is disposed on the first substrate between the liquid crystal layer 222 and first substrate 224a, the second electrode 230b is disposed on second substrate 224b between the liquid crystal layer 222 and second substrate 224b, and the voltage is provided by power source 228. The liquid crystal lens module 220 further includes alignment layers 232 disposed on first electrode 230a and second electrode 230b respectively and in contact with two opposing sides of liquid crystal layer 222. The alignment layers 232a and 232b are layers having a surface texture to align the liquid crystal molecules 226 to an initial direction by controlling the pretilt angle and the polar angle of the liquid crystal molecules 226. The pretilt angle is an angle between the long axis of a liquid crystal molecule 226 and a plane perpendicular to the z-direction, the polar angle is an angle between the long axis of a liquid crystal 226 and a fixed axis (e.g. along x-direction) in the plane perpendicular to z-direction. The materials for alignment layer 232 used in the present embodiments may be a polymer such as polyimide, but is not limited thereto.

Referring to FIG. 4A, the liquid crystal layer 222 of liquid crystal lens module 220 is a layer with non-uniform thickness. As shown in FIG. 4A, liquid crystal layer 222 has curved surface and a flat surface, and is thickest in the middle part. The curved surface of the liquid crystal layer 222 corresponds to a curved surface of first substrate 224a, curved first electrode 230a and a curved top alignment layer 232. Furthermore, in the present embodiment, when disconnected from power source 228, liquid crystal molecules 226 are aligned to be substantially in the same orientation throughout liquid crystal layer 222, i.e. all the long axis of liquid crystal molecules 226 are along the horizontal x-direction, wherein the x-direction and z-direction are orthogonal. When the electrodes 230a and 230b are connected to power source 228, as shown in FIG. 4B, the orientation of liquid crystal molecules 226 is rotated such that the long axis is aligned to the z-direction.

In the present embodiment, liquid crystal lens module 220 of FIG. 4A-4B can be regarded as a refractive lens. Specifically, when liquid crystal lens module 220 is not connected to power source 228, the liquid crystal layer 222 has a first effective refractive index such that when combined with the convex shape of the liquid crystal lens module 220, light entering along the z-direction will be focused to a first focal length F1. In FIG. 4B, when liquid crystal layer 222 is connected to power source 228, the alignment of liquid crystal molecules 226 along the z-direction change the effective refractive index of the liquid crystal layer 222 to a second effective refractive index such that when combined with the convex shape of the liquid crystal layer 222, light entering along the z-direction will be focused to a second focal length F2. Therefore, the focal length of liquid crystal lens module 220 can be controlled by switching the power source 228 on or off.

Figure 5:
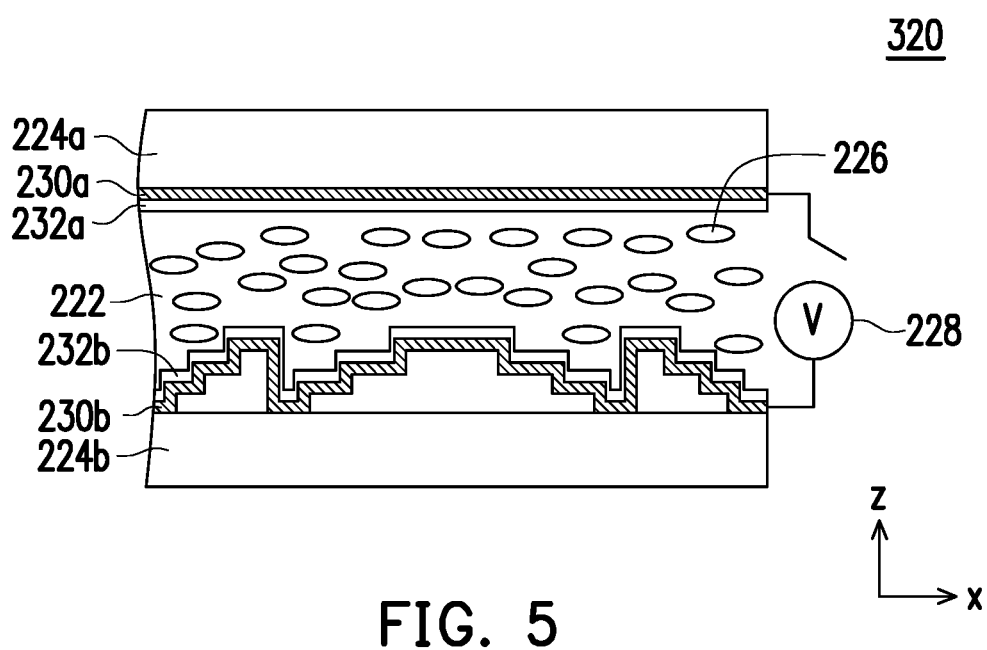
FIGS. 5-8 are schematic cross-sectional views of various liquid crystal lens modules of FIG. 2 according to at least one embodiment of the invention.

FIG. 5 is a schematic cross-sectional view of liquid crystal lens module 320 according to an embodiment of the invention. The liquid crystal lens module 320 includes first substrate 224a, second substrate 224b, liquid crystal layer 222, first electrode 230a, second electrode 230b and alignment layers 232a and 232b that are arranged similarly to liquid crystal lens module 220. Referring to FIG. 5, the difference between liquid crystal lens module 320 and liquid crystal lens module 220 lies in the first substrate 224a, the first and second electrodes 230a and 230b, and the shape of first alignment layers 232a. Specifically, in FIG. 5, the first substrate 224a is a substrate having uniform thickness in z-direction, the first electrode 230a and top alignment layer 232 is planar, and the second electrode 230b and second alignment layers 232b are stepped. Due second electrode 230b and second alignment layers 332 being stepped, the liquid crystal layer 222 is liquid crystal layer having non-uniform thickness that has optical properties of a diffractive lens. The stepped second electrode 230b and second alignment layer 232b may be designed, for example, in a way that the liquid crystal layer 222 following the shape of the steps may be a Fresnel lens, but the invention is not limited thereto. Similar to liquid crystal lens module 220, the focal length of liquid crystal lens module 320 may be controlled by applying a voltage across first electrodes 230a and second electrodes 230b.

Figure 6A:
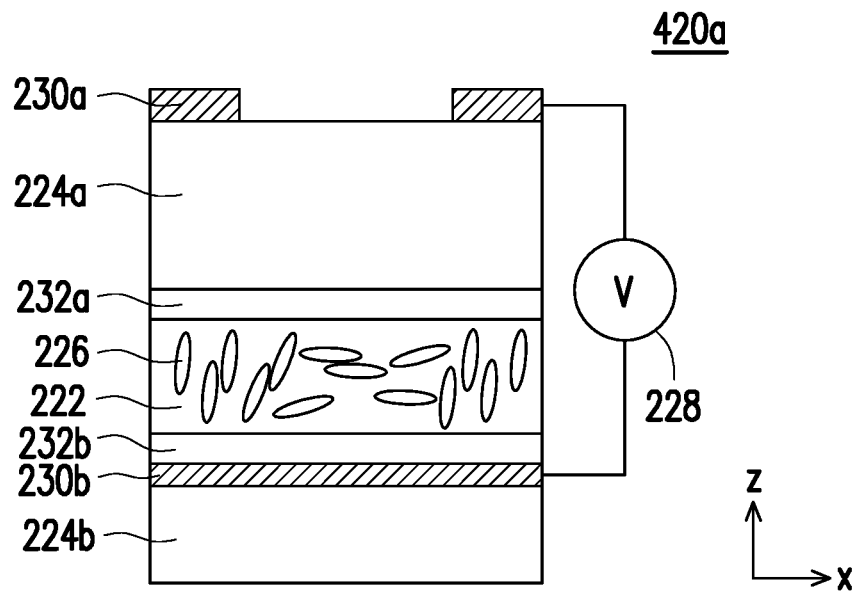

FIG. 6A is a schematic cross-sectional view of liquid crystal lens module 420a according to an embodiment of the invention.

In FIG. 6A, the liquid crystal lens module 420a includes first substrate 224a, second substrate 224b, liquid crystal layer 222, second electrode 230b and alignment layers 232a and 232b that are arranged similarly to liquid crystal lens module 220. Referring to FIG. 6A, the difference between liquid crystal lens module 420a and liquid crystal lens module 220 lies in the first substrate 224a, the first electrode 230a, and the first alignment layers 232a. Specifically, in FIG. 6A, the first substrate 224a is a substrate having uniform thickness in z-direction, the first electrode 230a is a patterned electrode having a gap or opening in between and disposed on a side of the first substrate 224a opposite the liquid crystal layer 222, and the first alignment layers 232a is planar. Accordingly, the liquid crystal layer 222 of the present embodiment has uniform thickness. In some embodiments, the first electrode 230a may also be disposed between the first substrate 224a and the first alignment layers 232a, but is not limited thereto.

Due to the pattern of the first electrode 230a, voltage in the liquid crystal layer 222 is unevenly distributed, resulting in liquid crystal molecules having varying orientation when first electrode 230a is connected to a power source. In some embodiments, the pattern of the first electrode 230a may be any other pattern other than the pattern shown in FIG. 6A. The uneven distribution of liquid crystal orientation produces a distributed refractive index. Depending on the distribution of the refractive index, the liquid crystal lens module 420a may be a refractive lens or a diffractive lens.

Figure 6B:
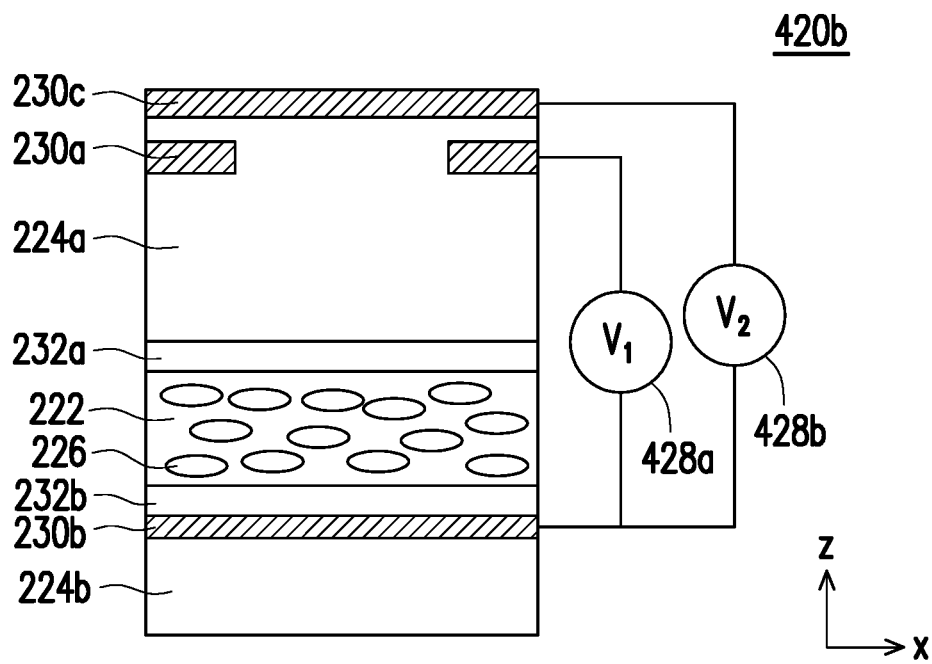

FIG. 6B is a schematic cross-sectional view of liquid crystal lens module 420b according to an embodiment of the invention. Liquid crystal lens module 420b is similar to liquid crystal lens module 420a except that liquid crystal lens module 420b further includes a third electrode 230c disposed adjacent to the first electrode 230a away from the liquid crystal layer 222. In this embodiment, the first and second electrode 230a and 230b may connect to a first power source 428a to be provided with voltage V1, while the third and second electrode 430c and 430b may connect a second power source 428b to be provided with voltage V2. The addition of third electrode 230c allows further control of voltage distribution in the liquid crystal layer 222 to provide further fine tuning of the optical properties. Depending on the distribution of the refractive index, the liquid crystal lens module 420b may be a refractive lens or a diffractive lens.

Figure 7:
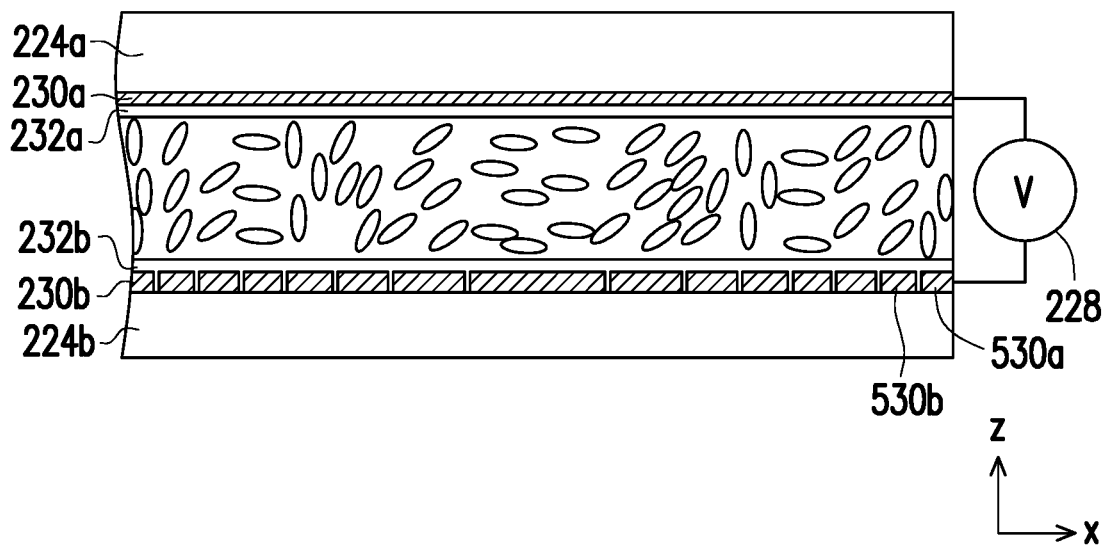

FIG. 7 is a schematic cross-sectional view of liquid crystal lens module 520 according to an embodiment of the invention. Liquid crystal lens module 520 is a liquid crystal lens module with liquid crystal layer 222 having uniform thickness. Specifically, the liquid crystal lens module 520 includes first substrate 224a and second substrate 224b, liquid crystal layer 222, second electrode 230b and alignment layers 232a and 232b that are arranged similarly to liquid crystal lens module 420a. Difference between liquid crystal lens module 520 and liquid crystal lens module 420a lies in the position of first electrode 230a and structure of second electrode 230b. Specifically, in FIG. 7, the first electrode 230a is disposed between the first substrate 224a and the first alignment layers 232a, and the second electrode 230b is a pixilated electrode. The second electrode 230b includes at least one electrode 530a connected to a power source 228 and at least one floating electrode 530b disposed adjacent to the electrode 530a to form the pixilated structure. The floating electrodes 530b are separated by insulators disposed therebetween, such as being separated by part of the first alignment layers 232b as shown in FIG. 7. In some embodiments, floating electrodes 530b can also be disposed on the first substrate 230a, the second substrate 230b, or both the first substrate 230a and the second substrate 230b. The voltages across floating electrodes 530b of second electrode 230b are related to the adjacent electrode 530a. Floating electrodes 530b provides more steps of voltage change to better control orientation of liquid crystal molecules in the liquid crystal layer 222. Alternatively, some or all of the floating electrodes 530b may also be individually connected to other power sources to further control the liquid crystal molecules. Depending on the distribution of the refractive index, the liquid crystal lens module 520 may be a refractive lens or a diffractive lens.

Figure 8:
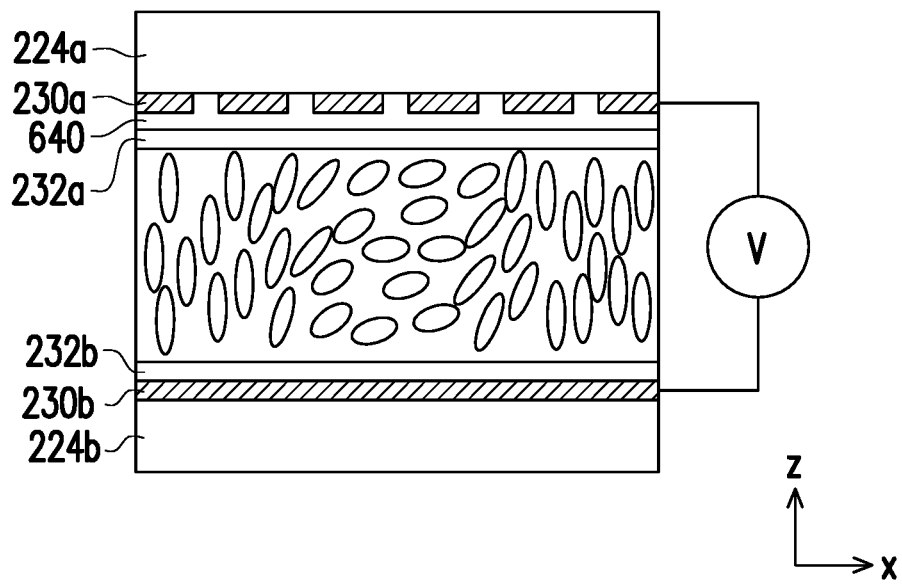

FIG. 8 is a schematic cross-sectional view of liquid crystal lens module 620 according to an embodiment of the invention. Liquid crystal lens module 620 is similar to liquid crystal lens module 520 except that liquid crystal lens module 620 has pixilated first electrode 230, and further includes a high impedance material layer 640 disposed between the pixilated first electrode 230a and first alignment layers 232a. The high impedance material layer 640 provide continuous varying voltage between the electrodes, therefore improving the quality of the image formed. The sheet resistance of the high impedance material layers 640 ranges from $10^9$ to $10^{14} \Omega$/sq. The high impedance material layers 640 are made of semiconductor material including a III-V semiconductor compound or a II-VI semiconductor compound, or polymer material including PEDOT (poly(3,4-ethylenedioxythiophene)), for example. Of course, the high impedance material layer 640 may be implemented in any of the liquid crystal lens module described above and may have any other pattern. The invention is not limited thereto.

Figure 9:
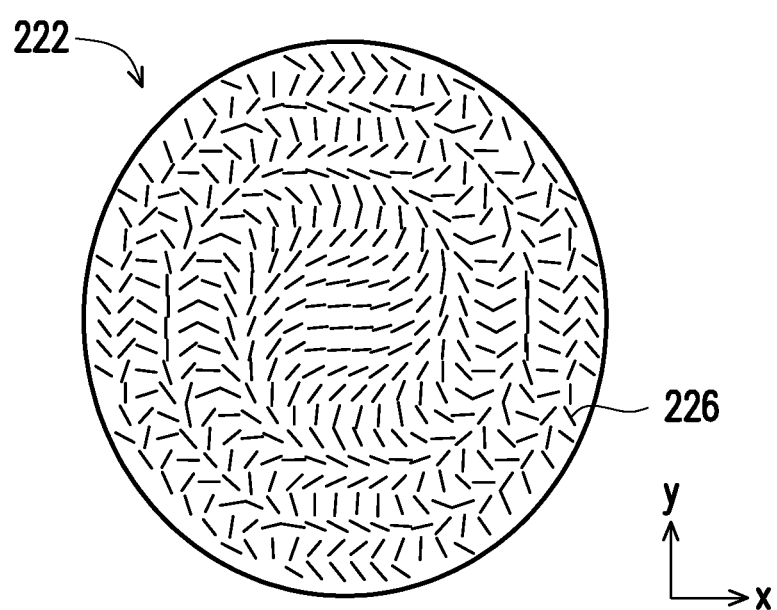
FIG. 9 is a schematic diagram of a liquid crystal layer from a top view, in accordance with at least one embodiment of the invention.

FIG. 9 is a schematic diagram of a liquid crystal layer 222 from a top view, i.e. along z-direction, according to an embodiment of the invention. Specifically, FIG. 9 is an exemplary arrangement pattern of the liquid crystal molecules in the liquid crystal layer 222 in the x-y plane due to alignment layer control. The y-direction provided in FIG. 9 is the direction perpendicular to both x and z direction. In FIG. 9, the polar angle of liquid crystal molecules are controlled by the alignment layer to form the Pancharatnam-Berry phase liquid crystal lens. Other liquid crystal lens may be formed by having alignment layers with different surface pattern and the invention is not limited thereto.

Figure 10A:
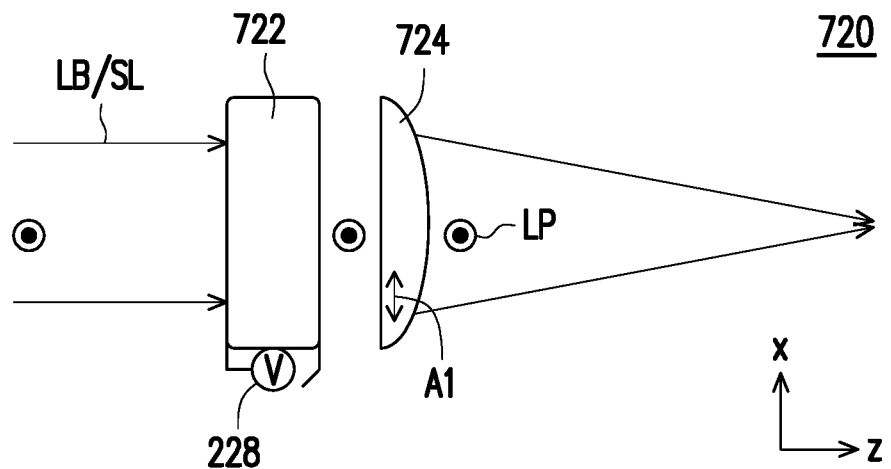
FIGS. 10A-10B are schematic cross-sectional diagrams of another liquid crystal lens modules under two different states according to at least one embodiment of the invention.
Figure 10B:
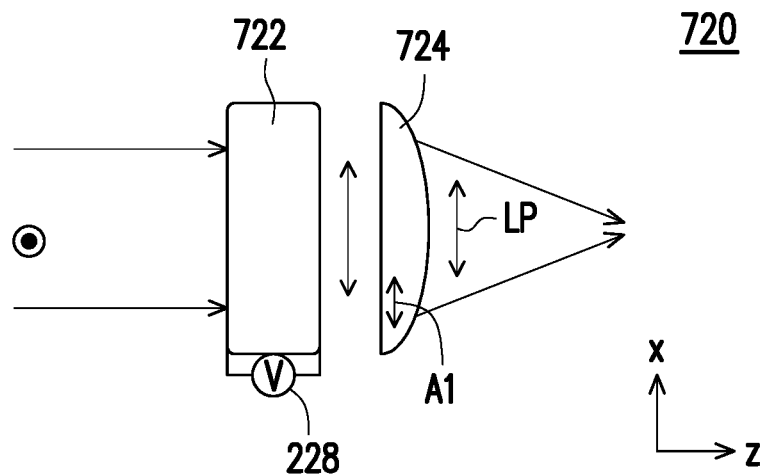

FIGS. 10A and 10B are schematic cross-sectional views of liquid crystal lens module 720 according to an embodiment of the invention. In FIG. 10, the liquid crystal lens module 720 includes a liquid crystal cell 722 and an anisotropic lens 724, wherein the liquid crystal cell 722 is connected to a power source 228. In liquid crystal lens module 720, the liquid crystal cell 722 is disposed on a path of a light polarized in the direction perpendicular to x and z direction. The liquid crystal cell 722 is configured to control the polarization of the incoming light.

Referring to FIGS. 10A and 10B, when the liquid crystal cell 722 is in an off state (voltage not applied), the polarization of incoming light is not affected, when the liquid crystal cell 722 is in an on state (voltage applied), the polarization of incoming light is rotated 90° to be along the x-direction. In other words, when liquid crystal cell 722 is on, liquid crystal cell acts as a half waveplate to change the polarization of incoming light. The anisotropic lens 724 is disposed on the path of light passing through liquid crystal cell 722. The anisotropic lens 724 is a lens which has refractive index (hence focal length) that depends on the polarization of light, for example when light is polarized in optical axis A1 direction of the anisotropic lens, the refractive index is at maximum, when light is polarized orthogonal to optical axis A1 direction, the refractive index is at minimum. Because the on and off state of the liquid crystal cell 722 changes the polarization of light, the focal length of the anisotropic length is also changed. The liquid crystal lens module 720 is also referred to as a passive liquid crystal lens because the liquid crystal cell does not actively converge or diverge the light.

The voltage distribution applied to the electrodes of the liquid crystal lens module, liquid crystal lens cell and to the liquid crystal cell as described above may be controlled by a controller coupled to the electrodes. In some embodiments, the controller is, for example, a central processing unit (CPU), a microprocessor, a digital signal processor (DSP), a programmable controller, a programmable logic device (PLD), or other similar devices, or a combination of the said devices, which are not particularly limited by the invention. Further, in some embodiments, each of the functions of the controller may be implemented as a plurality of program codes. These program codes will be stored in a memory or a non-transitory storage medium, so that these program codes may be executed by the controller. Alternatively, in an embodiment, each of the functions of the controller may be implemented as one or more circuits. The invention is not intended to limit whether each of the functions of the controller is implemented by ways of software or hardware.

By including a liquid crystal lens having variable focal length into a structured light projector, the focusing range of a structured light projector becomes tunable and is able cover a wider range, allowing features of 3D objects at different distances to be measured. Furthermore, when compared to the traditional voice coil motor (VCM) in a focusing lens, the optical projector using liquid crystal lens has the advantage of being more compact and having low power consumption. Hence, the optical projector of the invention may be easily fitted in mobile electronic devices, providing the feature of 3D sensing to mobile electronic devices.

Figure 11A:
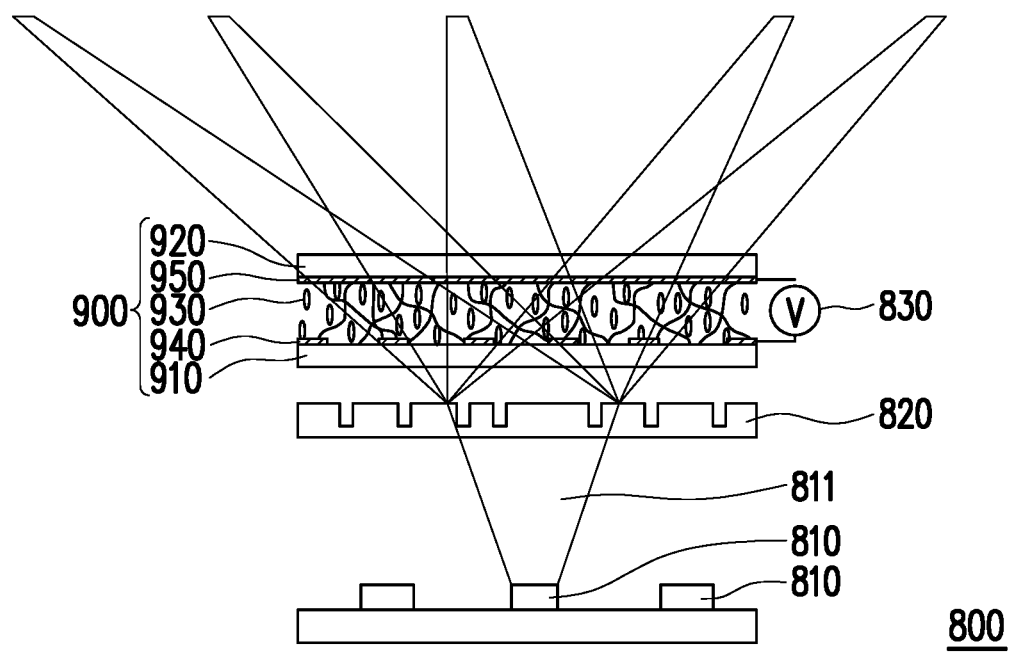
FIG. 11A and FIG. 11B are schematic cross-sectional views of a tunable light projector respectively in a structured light mode and a flood light mode according to an embodiment of the invention.
Figure 11B:
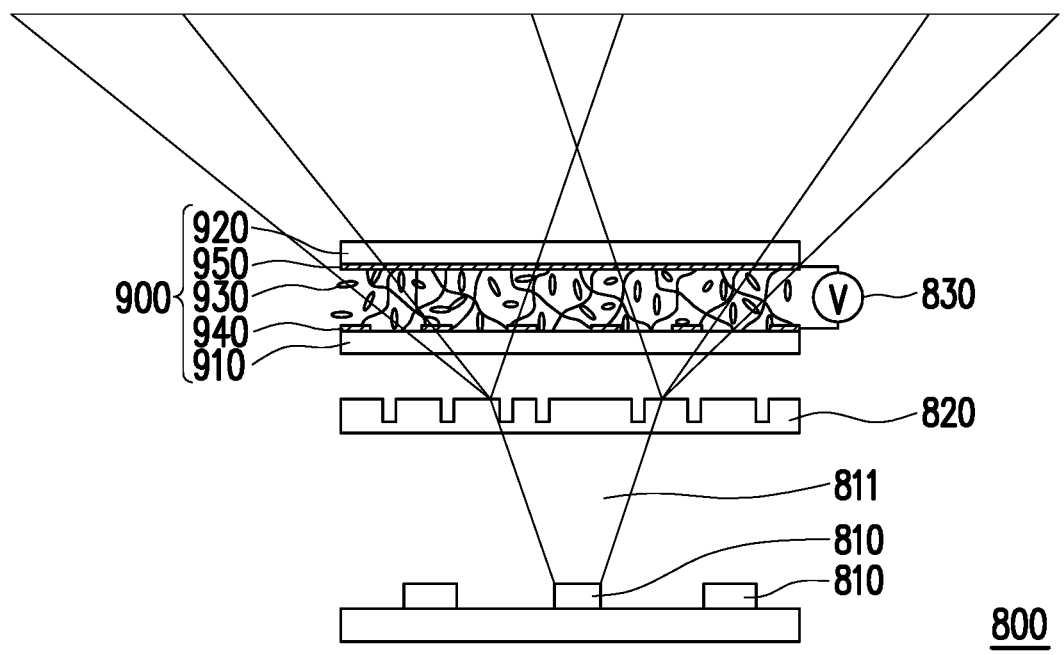

FIG. 11A and FIG. 11B are schematic cross-sectional views of a tunable light projector respectively in a structured light mode and a flood light mode according to an embodiment of the invention. Referring to FIG. 11A and FIG. 11B, a tunable light projector 800 in this embodiment includes at least one light source 810 (a plurality of light sources 810 are exemplarily shown in FIG. 11A and FIG. 11B), a fixed optical phase modulator 820, a tunable liquid crystal panel 900, and a driver 830. The light sources 810 are configured to emit a plurality of light beams 811 (a light source 810 emitting a light beam 811 is exemplarily shown in FIG. 11A and FIG. 11B). In this embodiment, the light sources 810 are respectively a plurality of light-emitting regions (or light-emitting points) of a VCSEL, a plurality of edge-emitting lasers (EELs), or a plurality of other appropriate laser emitters or laser diodes.

The fixed optical phase modulator 820 is disposed on a path of the light beam 811 and configured to modulate phases of the light beam 811. In this embodiment, the fixed optical phase modulator 820 is a DOE or a lens array which modulates the light beam 811 to a structured light.

The tunable liquid crystal panel 900 is disposed on the path of the light beam 811 from the fixed optical phase modulator 820 and configured to switch the light beam 811 between a structured light (as shown in FIG. 11A) and a flood light (as shown in FIG. 11B). The tunable liquid crystal panel 900 includes a first substrate 910, a second substrate 920, a liquid crystal layer 930, a first electrode layer 940, and a second electrode layer 950. The liquid crystal layer 930 is disposed between the first substrate 910 and the second substrate 920. At least one of the first electrode layer 940 and the second electrode layer 950 is a patterned layer. FIG. 11A and FIG. 11B show that the first electrode layer 940 is a patterned layer. However, in other embodiments, the second electrode layer 950 may be a patterned layer, or both the first electrode layer 940 and the second electrode layer 950 may be patterned layers. In this embodiment, the first substrate 910 and the second substrate 920 are transparent substrates, e.g. glass substrates or plastic substrates. The first electrode layer 940 and the second electrode layer 950 may be made of indium tin oxide (ITO), any other transparent conductive metal oxide, or any other transparent conductive material.

The first electrode layer 940 and the second electrode 950 are both disposed on one of the first substrate 910 and the second substrate 920, or are respectively disposed on the first substrate 910 and the second substrate 920. The driver 830 is electrically connected to the first electrode layer 940 and the second electrode layer 950 and configured to change a voltage difference between the first electrode layer 940 and the second electrode layer 950, so as to switch the light beam 811 between the structured light and the flood light. Specifically, the optical spatial phase distribution of the liquid crystal layer 930 is changed with the change of the voltage difference, so as to switch the light beam 811 between the structured light and the flood light.

For example, in FIG. 11A, the voltage difference between the first electrode layer 940 and the second electrode layer 950 is about zero, and the refractive index distribution of the liquid crystal layer 930 is uniform, so that the liquid crystal layer 930 is like a transparent layer. As a result, the structured light from the fixed optical phase modulator 820 passes through the transparent layer and is still a structured light, and the tunable light projector 800 is in a structured light mode. In FIG. 11B, the voltage difference between the first electrode layer 940 and the second electrode layer 950 is not equal to zero, and the refractive index distribution of the liquid crystal layer 930 is not uniform, so that the liquid crystal layer 930 is like a lens array. As a result, the structured light from the fixed optical phase modulator 820 is converted to a flood light by the lens array, and the tunable light projector 300 is in a flood light mode. The structured light may irradiate an object and form a light pattern with dots, stripes, or any other suitable pattern on the object. The flood light may uniformly irradiate the object.

In the tunable light projector in this embodiment, the tunable liquid crystal panel 900 is adopted to switch the light beam 811 between a structured light and a flood light, so that this embodiment integrates a flood light system and a structured light system into a single system, which reduces the cost and the volume of an electronic device having structured light and flood light functions.

In another embodiment, the fixed optical phase modulator 820 is configured to modulate the light beam 811 to a flood light. Moreover, when the voltage difference between the first electrode layer 940 and the second electrode layer 950 is about zero, the flood light from the fixed optical phase modulator 820 passes through the liquid crystal layer 930 being a transparent layer and is then still a flood light. When the voltage difference between the first electrode layer 940 and the second electrode layer 950 is not zero, the flood light from the fixed optical phase modulator is converted into a structured light by the liquid crystal layer 930 being an optical layer like a lens array.

In still another embodiment, the fixed optical phase modulator 820 is configured to modulate light beam to a collimated light, and two voltage differences between the first electrode layer 940 and the second electrode layer 950 respectively switch the liquid crystal layer 930 to two refractive index distributions so as to switch the collimated light from the fixed optical phase modulator to a structured light and a flood light, respectively.

Figure 12A:
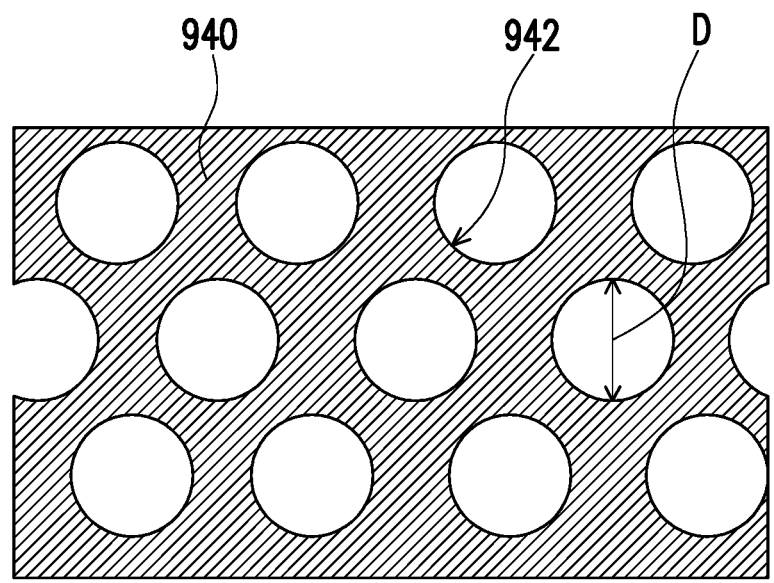
FIG. 12A, FIG. 12B, and FIG. 12C are schematic top views of the first electrode layer in FIG. 11A and FIG. 11B respectively according to three embodiments in the invention.
Figure 12B:
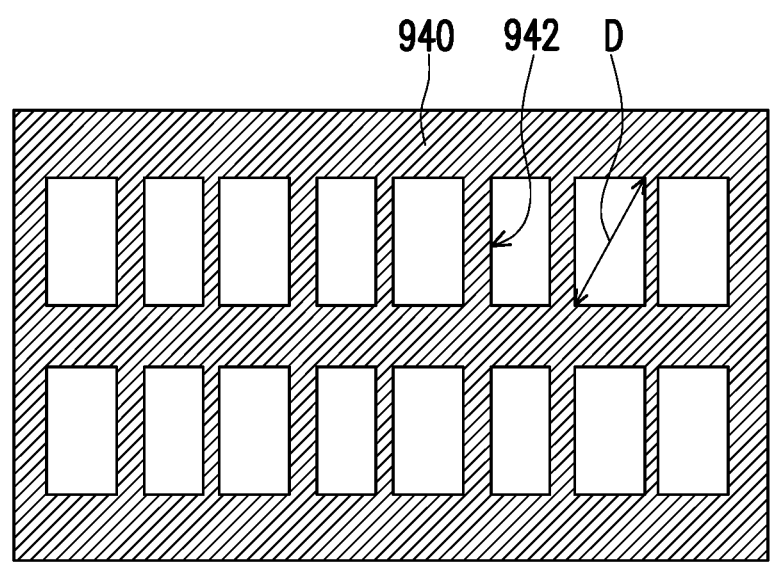
Figure 12C:
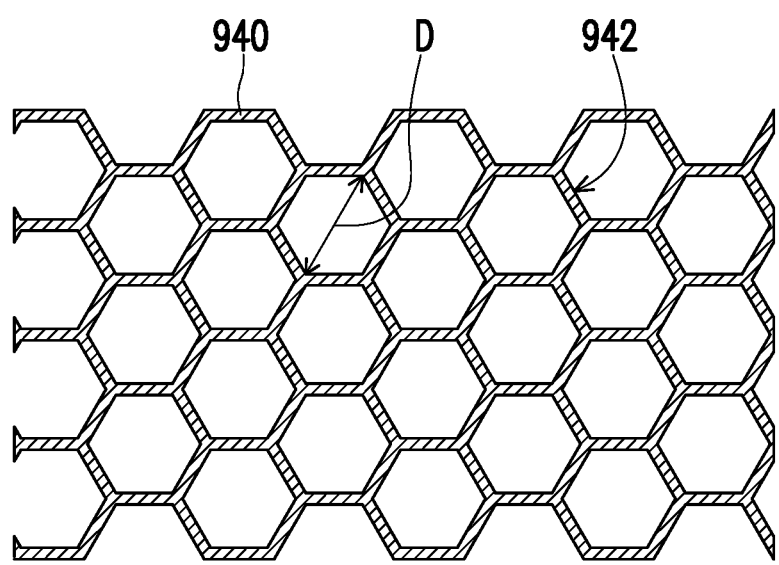

FIG. 12A, FIG. 12B, and FIG. 12C are schematic top views of the first electrode layer in FIG. 11A and FIG. 11B respectively according to three embodiments in the invention. Referring to FIG. 12A, FIG. 12B, and FIG. 12C, the patterned layer (e.g. the first electrode layer 940 or the second electrode layer 950, and the figures show the first electrode layer 940 as examples) has a plurality of micro-openings 942 having a maximum diameter D less than 1 millimeter. The shapes of the micro-openings 942 includes circles (as shown in FIG. 12A), rectangles (as shown in FIG. 12B), squares, hexagons (as shown in FIG. 12C), other geometric shapes, other irregular shapes, or a combination thereof.

Figure 13A:
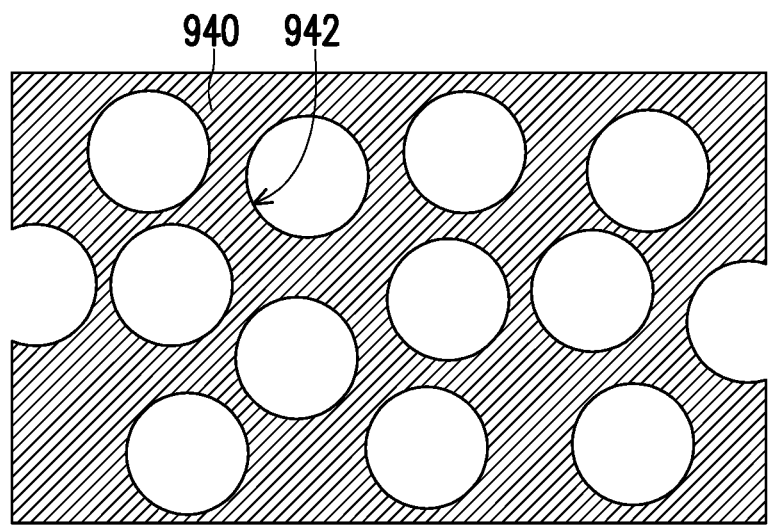
FIG. 13A, FIG. 13B, and FIG. 13C are schematic top views of other three variations of the first electrode layer in FIG. 12A.
Figure 13B:
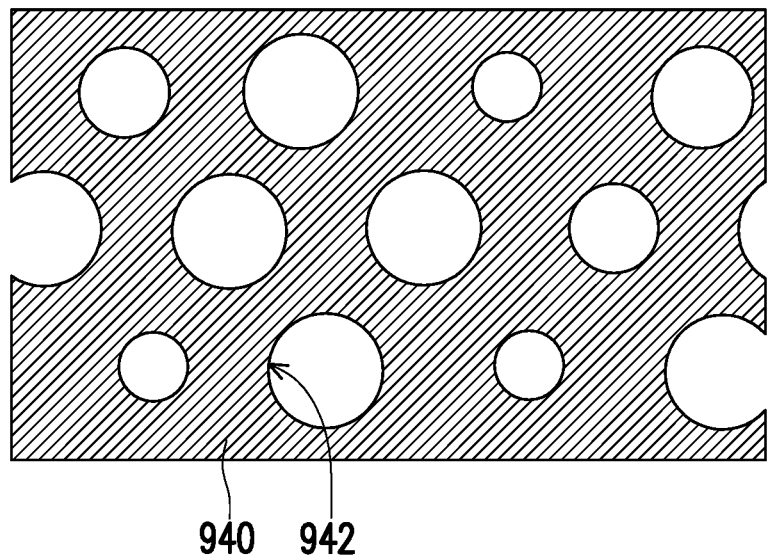
Figure 13C:
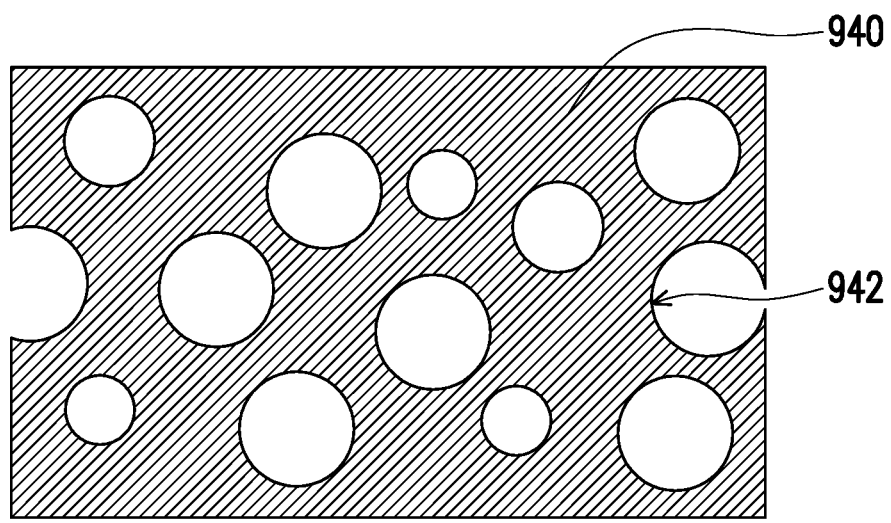

FIG. 13A, FIG. 13B, and FIG. 13C are schematic top views of other three variations of the first electrode layer in FIG. 12A. Referring to FIG. 12A, FIG. 13A, FIG. 13B, and FIG. 13C, sizes and positions of the micro-openings 942 may be regular or irregular. For example, in FIG. 12A, the sizes of the micro-openings 942 are equal to one another, and the positions of the micro-openings 942 are regular. In FIG. 13A, the sizes of the micro-openings 942 are equal to one another, and the positions of the micro-openings 942 are irregular. In FIG. 13B, the micro-openings 942 have different sizes, and the positions of the micro-openings 942 are regular. In FIG. 13C, the micro-openings 942 have different sizes, and the positions of the micro-openings 942 are irregular.

Figure 14A:
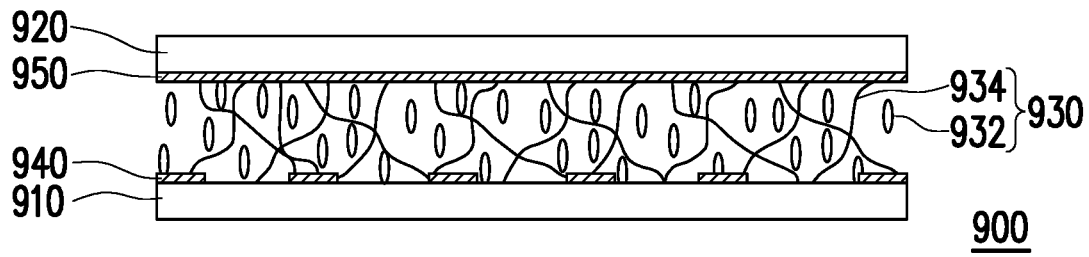
FIG. 14A is a schematic cross-sectional view of the tunable liquid crystal panel in FIG. 11A.
Figure 14B:
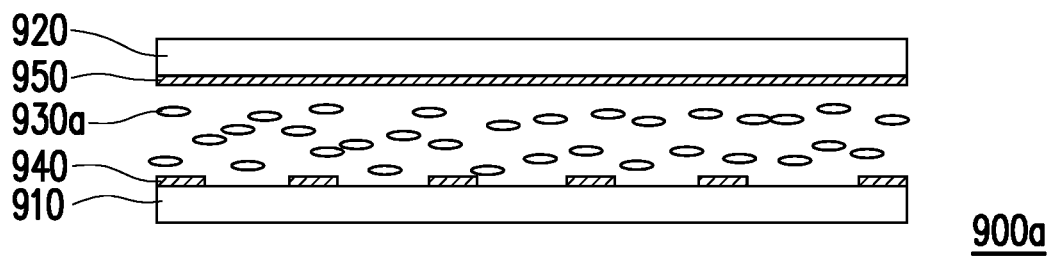
FIG. 14B and FIG. 14C are other two variations of the tunable liquid crystal panel in FIG. 14A.
Figure 14C:
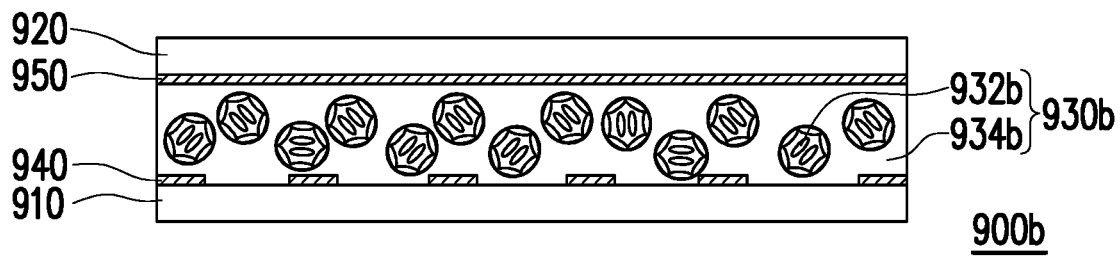

FIG. 14A is a schematic cross-sectional view of the tunable liquid crystal panel in FIG. 11A, and FIG. 14B and FIG. 14C are other two variations of the tunable liquid crystal panel in FIG. 14A. Referring to FIG. 14A, the tunable liquid crystal panel 900 has the liquid crystal layer 930 including polymer network liquid crystals (PNLCs), which includes liquid crystal molecules 932 with a polymer network 934. Referring to FIG. 14B, the tunable liquid crystal panel 900a may have a liquid crystal layer 930a including nematic liquid crystals. Referring to FIG. 14C, the tunable liquid crystal panel 900b may have a liquid crystal layer 930b including polymer dispersed liquid crystals (PDLCs), which includes liquid crystal molecules 932b with a polymer 934b.

Figure 15A:
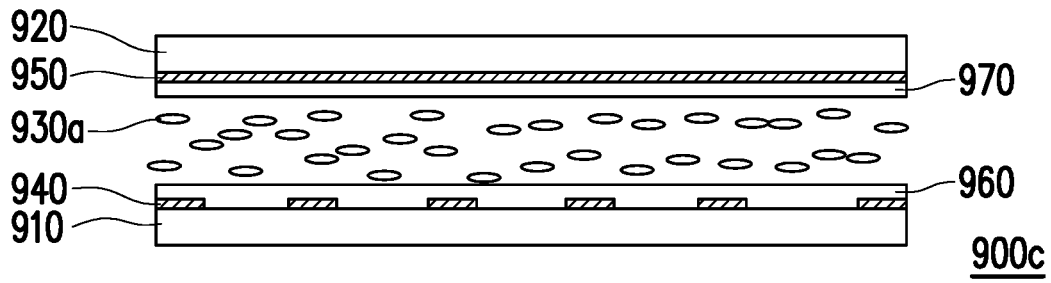
FIG. 15A is a schematic cross-sectional view of a tunable liquid crystal panel according to another embodiment of the invention.

FIG. 15A is a schematic cross-sectional view of a tunable liquid crystal panel according to another embodiment of the invention. Referring to FIG. 15A, the tunable liquid crystal panel 900c is similar to the tunable liquid crystal panel 900a in FIG. 14B, and the main difference therebetween is as follows. In this embodiment, the tunable liquid crystal panel 900c further includes a first alignment layer 960 and a second alignment layer 970. The first alignment layer 960 is disposed between the first substrate 910 and the liquid crystal layer 930a, and the second alignment layer 970 is disposed between the second substrate 920 and the liquid crystal layer 930a. In this embodiment, the first alignment layer 960 is disposed between the first electrode layer 940 and the liquid crystal layer 930a, and the second alignment layer 970 is disposed between the second electrode layer 950 and the liquid crystal layer 930a. In this embodiment, the first alignment layer 960 and the second alignment layer 970 are parallel alignment layers.

Figure 15B:
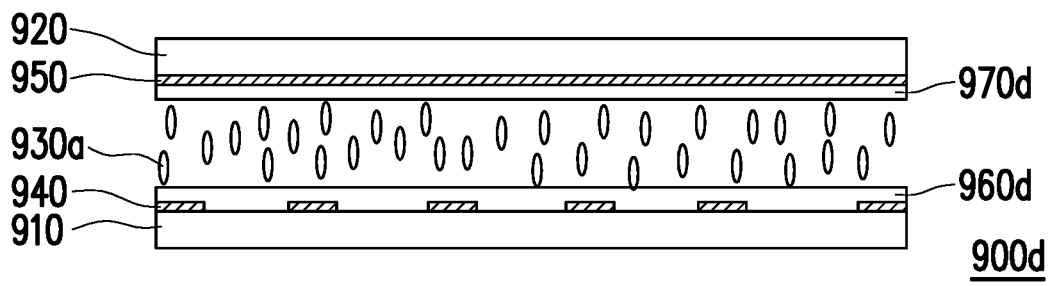
FIG. 15B is a schematic cross-sectional view of a tunable liquid crystal panel according to another embodiment of the invention.

FIG. 15B is a schematic cross-sectional view of a tunable liquid crystal panel according to another embodiment of the invention. Referring to FIG. 15B, the tunable liquid crystal panel 900d is similar to the tunable liquid crystal panel 900c, and the main difference therebetween is as follows. In the tunable liquid crystal panel 900d according to this embodiment, the first alignment layer 960d and the second alignment layer 970d are vertical alignment layers.

Figure 15C:
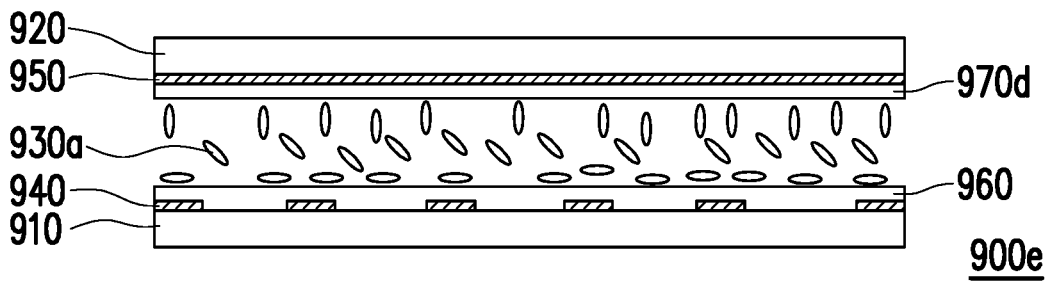
FIG. 15C is a schematic cross-sectional view of a tunable liquid crystal panel according to another embodiment of the invention.

FIG. 15C is a schematic cross-sectional view of a tunable liquid crystal panel according to another embodiment of the invention. Referring to FIG. 15C, the tunable liquid crystal panel 900e is similar to the tunable liquid crystal panel 900c, and the main difference therebetween is as follows. In the tunable liquid crystal panel 900e according to this embodiment, the first alignment layer 960 and the second alignment layer 970d are a combination of a vertical alignment layer and a parallel alignment layer. For example, the first alignment layer 960 is a parallel alignment layer, and the second alignment layer 970d is a vertical alignment layer.

Figure 16A:
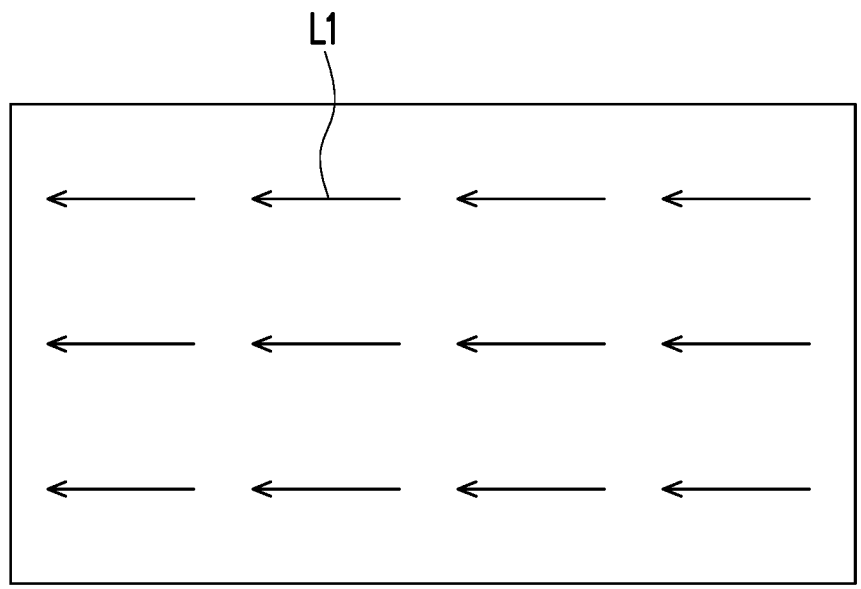
FIG. 16A shows the alignment direction of the first alignment layer or the second alignment layer in FIG. 15A or FIG. 15C according to an embodiment of the invention.

FIG. 16A shows the alignment direction of the first alignment layer or the second alignment layer in FIG. 15A or FIG. 15C according to an embodiment of the invention. Referring to FIG. 16A, in an embodiment, alignment directions L1 of the first alignment layer 960 and the second alignment layer 670 have uniform spatial distribution. In other words, the azimuthal angles of alignment in different areas of the first alignment layer 960 or the second alignment layer 670 are the same.

Figure 16B:
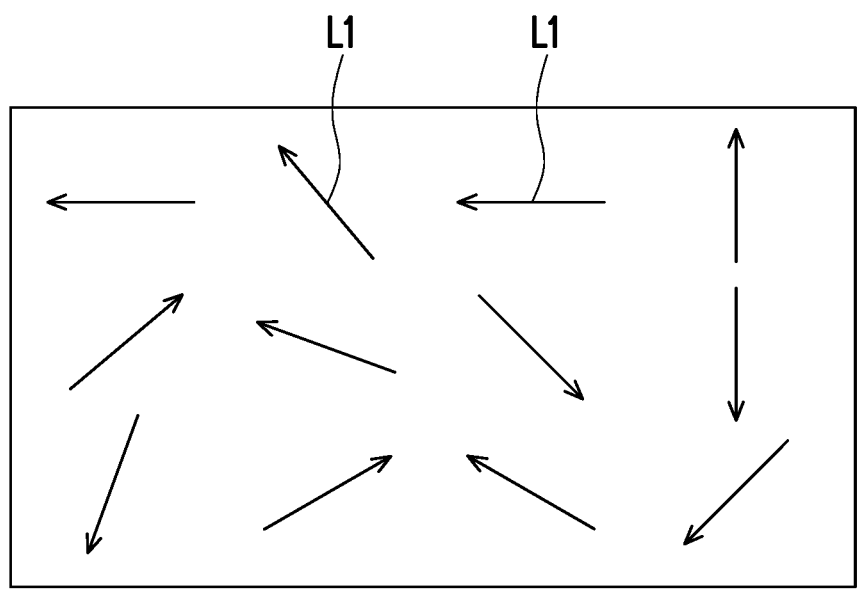
FIG. 16B shows the alignment directions of another variation of the first alignment layer or the second alignment layer in FIG. 15A or FIG. 15C according to another embodiment of the invention.

FIG. 16B shows the alignment directions of another variation of the first alignment layer or the second alignment layer in FIG. 15A or FIG. 15C according to another embodiment of the invention. Referring to FIG. 16B, in another embodiment, alignment directions L1 of the first alignment layer 960a and the second alignment layer 970a have random spatial distribution. In other words, the azimuthal angles of alignment in different areas of the first alignment layer 960a or the second alignment layer 970a are random. The different alignment directions and the different azimuthal angles may refract or diffract light beams 811 from the light sources 810 with different polarized directions.

Figure 17A:
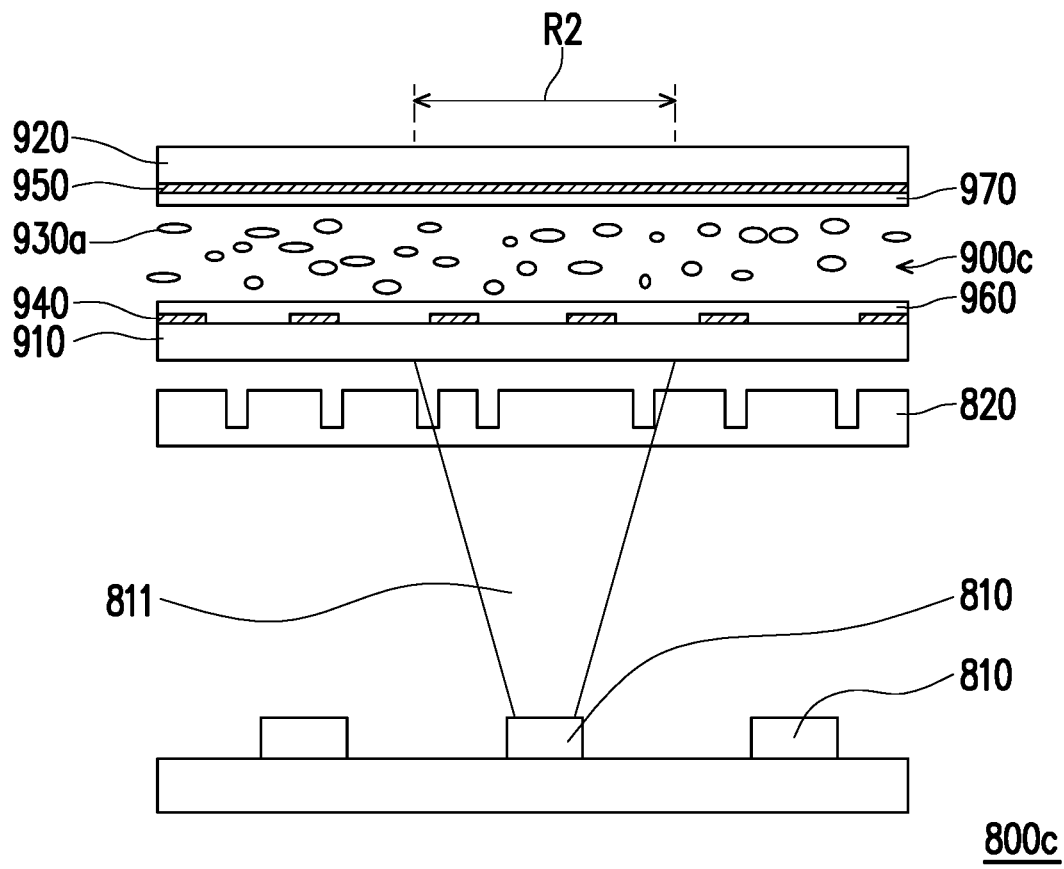
FIG. 17A is a schematic cross-sectional view of a tunable light projector adopting the alignment layers shown in FIG. 16B.
Figure 17B:
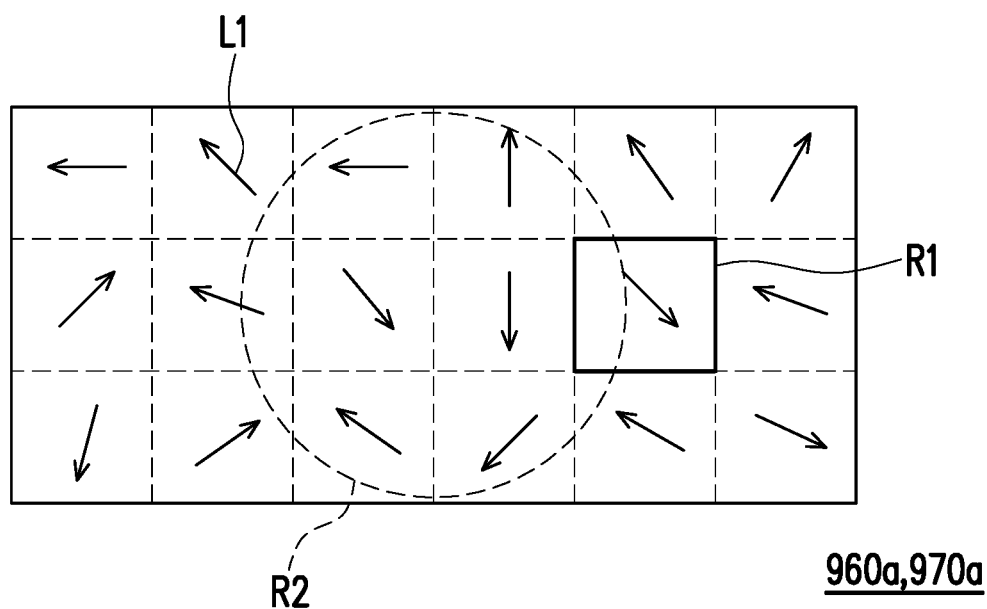
FIG. 17B shows a schematic top view of a spot area and the alignment layer in FIG. 17A.

FIG. 17A is a schematic cross-sectional view of a tunable light projector adopting the alignment layers shown in FIG. 16B. FIG. 17B shows a schematic top view of a spot area and the alignment layer in FIG. 17A. Referring to FIG. 17A and FIG. 17B, the tunable light projector 800c in this embodiment is similar to the tunable light projector 800 in FIG. 11A, and the main difference therebetween is as follows. In the tunable light projector 800c according to this embodiment, a locally same alignment direction area R1 of the random spatial distribution of alignment directions of the first alignment layer 960a and the second alignment layer 970a is smaller than a spot area R2 on the tunable liquid crystal panel 900c irradiated by the light beam 811 from the fixed optical phase modulator 820. As a result, various polarized directions of the light beam 811 may all be refracted or diffracted by the liquid crystal layer 900c.

Figure 18A:
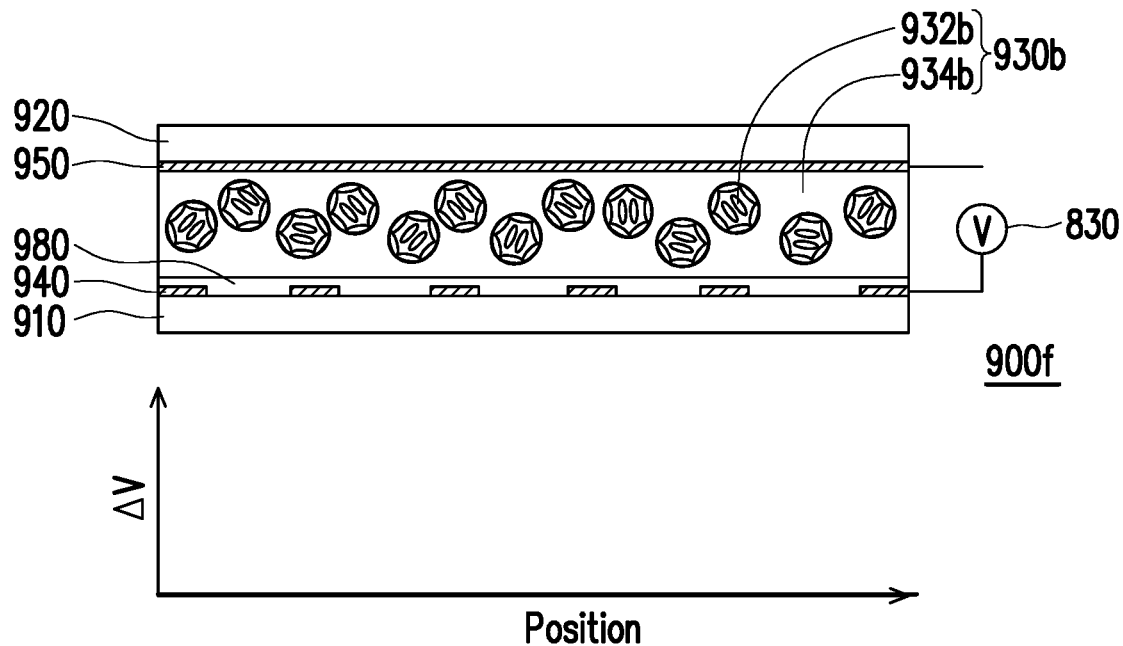
FIG. 18A, FIG. 18B, and FIG. 18C are schematic cross-sectional views of a tunable liquid crystal panel and the voltage difference applied to the liquid crystal layer in three different modes.
Figure 18B:
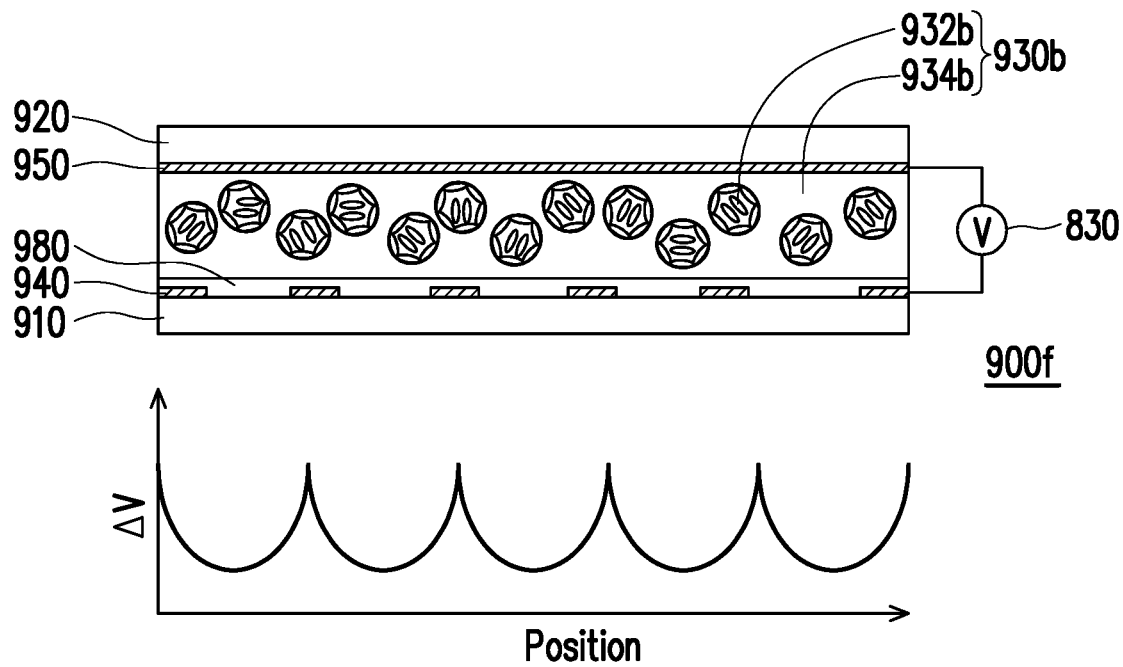
Figure 18C:
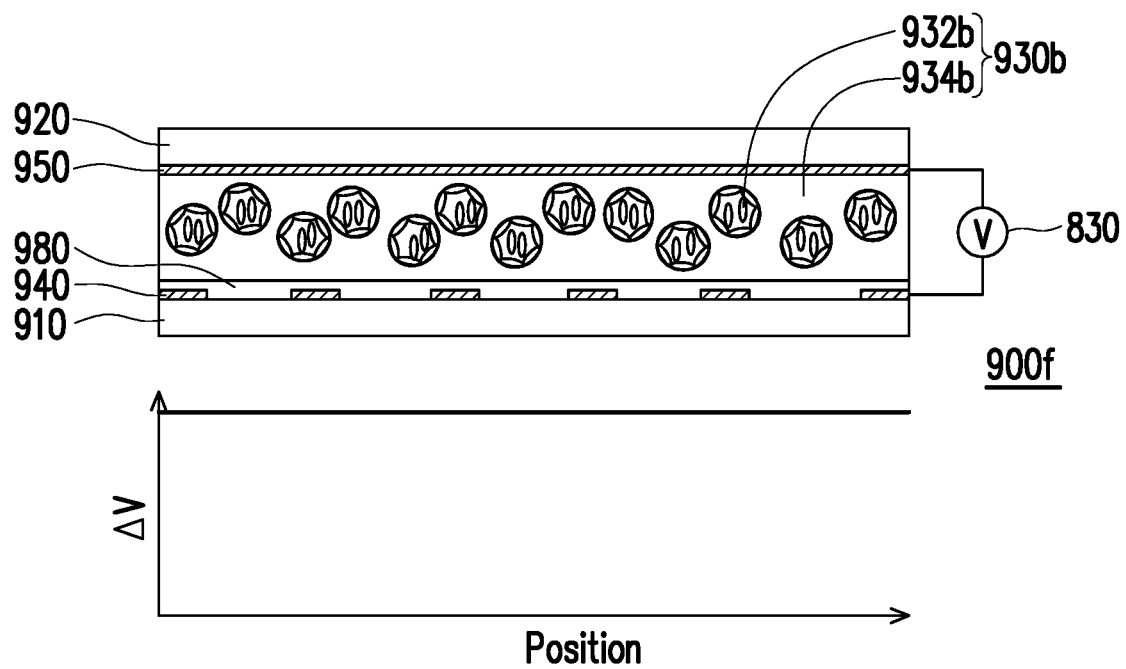

FIG. 18A, FIG. 18B, and FIG. 18C are schematic cross-sectional views of a tunable liquid crystal panel and the voltage difference applied to the liquid crystal layer in three different modes. Referring to FIG. 18A, FIG. 18B, and FIG. 18C, the tunable liquid crystal panel 900f in this embodiment is similar to the tunable liquid crystal panel 900b in FIG. 14C, and the main difference therebetween is as follows. The tunable liquid crystal panel 900f in this embodiment further includes a high resistive layer 980 (the same as the high impedance material layer 640 in FIG. 8) adjacent to the patterned layer (e.g. the first electrode layer 940). In FIG. 18A, when the voltage difference between the first electrode layer 940 and the second electrode layer 950 is zero, the voltage difference ΔV applied to the liquid crystal layer 930b is zero, and the liquid crystal layer 930b is in a scattering mode and is configured to scatter the light beam 811 from the fixed optical phase modulator 820.

In FIG. 18B, when the voltage difference between the first electrode layer 940 and the second electrode layer 950 is an alternating current (AC) with a high frequency (e.g. a frequency being greater than 1 kHz and being less than or equal to 60 kHz), the voltage difference ΔV applied to the liquid crystal layer 930 varies gradually with the positions due to the high resistive layer 930, and the liquid crystal layer 930b is in a scattering and light converging mode and is configured to slightly scatter and converge the light beam 811 from the fixed optical phase modulator 820.

In FIG. 18C, when the voltage difference between the first electrode layer 940 and the second electrode layer 950 is an alternating current (AC) with a low frequency (e.g. a frequency being greater than or equal to 60 Hz and being less than or equal to 1 kHz), the voltage difference ΔV applied to the liquid crystal layer 930 keeps about constant in various positions, the liquid crystal layer 930b is in a transparent mode and like a transparent layer, and the light beam 811 passes through the liquid crystal layer 930b. Moreover, the aforementioned high frequency is greater than the aforementioned low frequency.

Figure 19A:
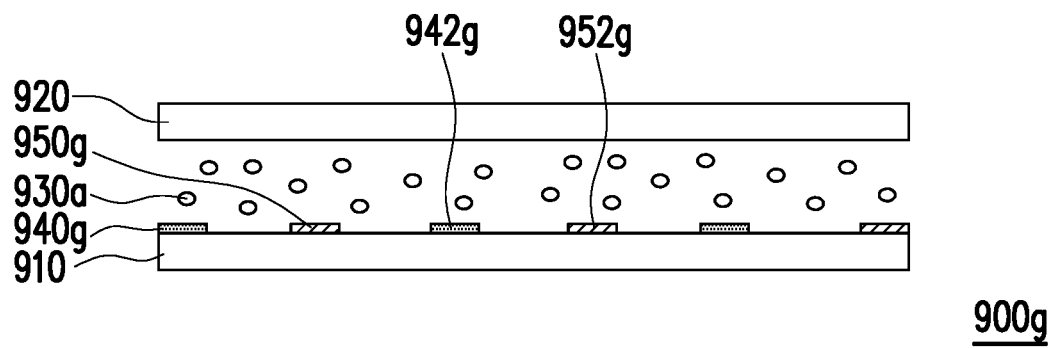
FIG. 19A is a schematic cross-sectional views of a tunable liquid crystal panel according to another embodiment of the invention.
Figure 19B:
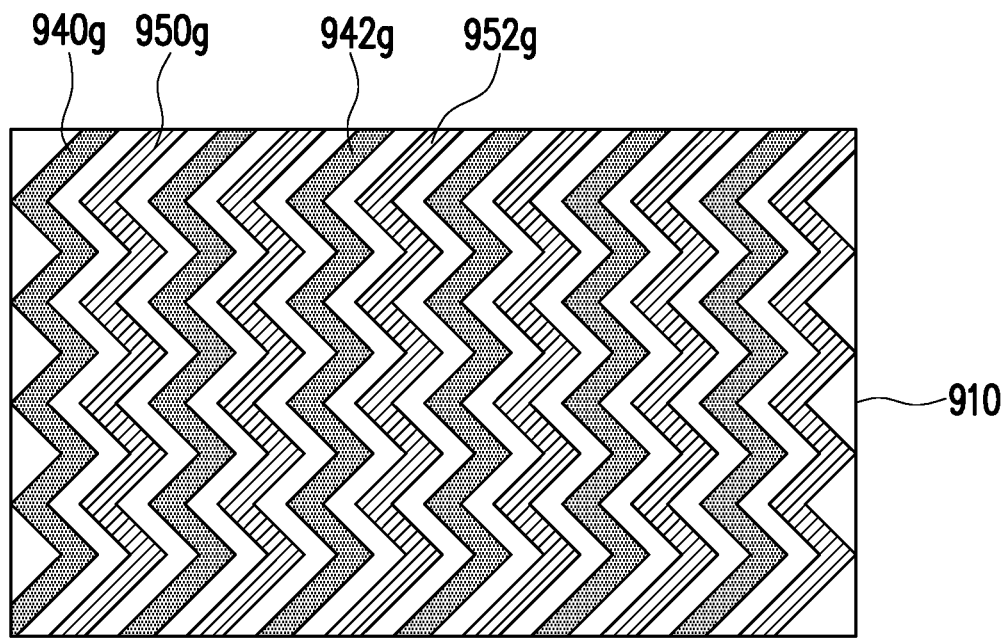
FIG. 19B is a schematic top view of the first substrate in FIG. 19A.

FIG. 19A is a schematic cross-sectional views of a tunable liquid crystal panel according to another embodiment of the invention, and FIG. 19B is a schematic top view of the first substrate in FIG. 19A. Referring to FIG. 19A and FIG. 19B, the tunable liquid crystal panel 900g in this embodiment is similar to the tunable liquid crystal panel 900c in FIG. 15A, and the main difference therebetween is as follows. In the tunable liquid crystal panel 900g according to this embodiment, the first electrode layer 940g and the second electrode layer 950g are both disposed on the same substrate, e.g. the first substrate 910, and are both patterned layers. The first electrode layer 940g and the second electrode layer 950g has an in-plane switch (IPS) electrode design. Specifically, the first electrode layer 940g includes a plurality of conductive micro-patterns 942g, and the second electrode layer 950g includes a plurality of conductive micro-patterns 952g. The conductive micro-patterns 942g and the conductive micro-patterns 952g are alternately arranged along a direction (e.g. the right direction in FIGS. 19A and 19B). The conductive micro-patterns 942g and the conductive micro-patterns 952g may have a straight shape. For example, each of the conductive micro-patterns 942g and the conductive micro-patterns 952g may extend along a direction perpendicular to the paper surface of FIG. 19A. However, in this embodiment, The conductive micro-patterns 942g and the conductive micro-patterns 952g may have a zigzag shape as shown in FIG. 19B.

Figure 20A:
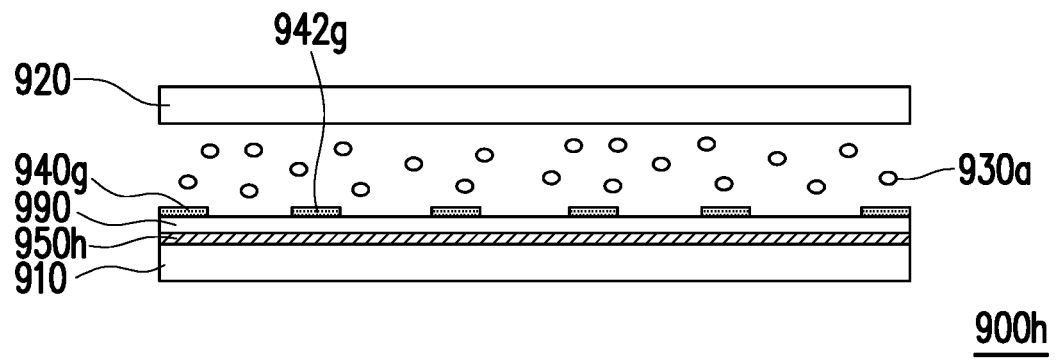
FIG. 20A is a schematic cross-sectional view of a tunable liquid crystal panel according to another embodiment of the invention.
Figure 20B:
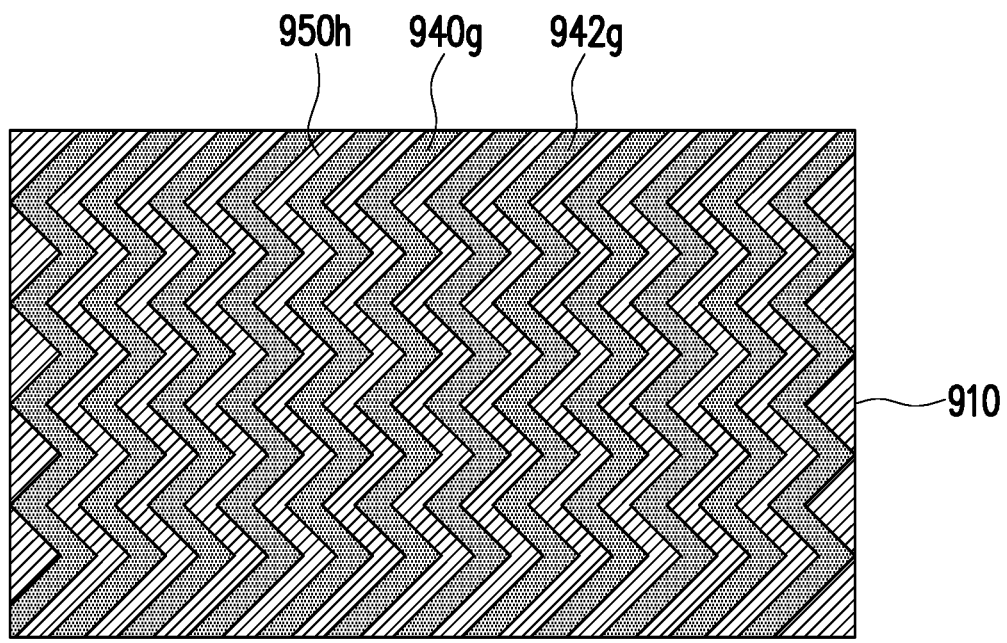
FIG. 20B is a schematic top view of the first substrate in FIG. 20A.

FIG. 20A is a schematic cross-sectional view of a tunable liquid crystal panel according to another embodiment of the invention, and FIG. 20B is a schematic top view of the first substrate in FIG. 20A. The tunable liquid crystal panel 900h in this embodiment is similar to the tunable liquid crystal panel 900g in FIG. 19A, and the main difference therebetween is as follows. In the tunable liquid crystal panel 900h according to this embodiment, the first electrode layer 940g and the second electrode layer 950h have a fringe-field switch (FFS) electrode design. The second electrode layer 950h is a plane continuous layer between the first electrode layer 940g and the substrate 910, and the first electrode layer 940g and the second electrode layer 950 are insulated from each other by an insulating layer 990 disposed therebetween. The first electrode layer 940g in FIG. 20A and FIG. 20B is the same as the description of the first electrode layer 940g in FIG. 19A and FIG. 19B.

Figure 21A:
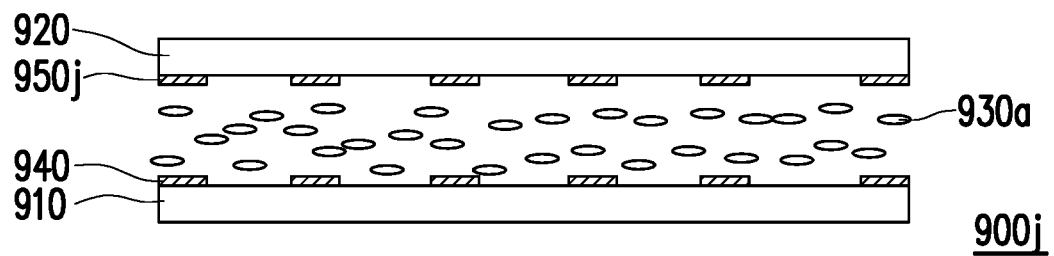
FIG. 21A is a schematic cross-sectional view of a tunable liquid crystal panel according to another embodiment of the invention.

FIG. 21A is a schematic cross-sectional view of a tunable liquid crystal panel according to another embodiment of the invention. Referring to FIG. 21A, the tunable liquid crystal panel 900j in this embodiment is similar to the tunable liquid crystal panel 900a in FIG. 14B, and the main difference therebetween is as follows. In the tunable liquid crystal panel 930a, the first electrode layer 940 and the second electrode layer 950j are two patterned layers disposed on the first substrate 910 and the second substrate 920, respectively, and patterns of the two patterned layers are the same. However, in other embodiment, patterns of the two patterned layers may be different.

Figure 21B:
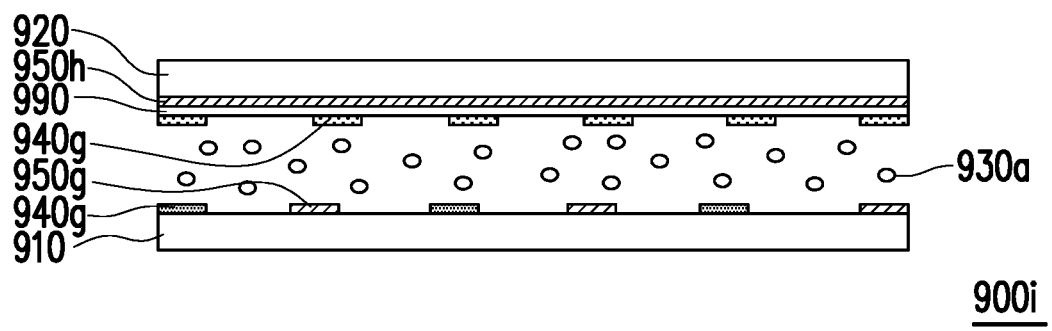
FIG. 21B is a schematic cross-sectional view of a tunable liquid crystal panel according to another embodiment of the invention.

FIG. 21B is a schematic cross-sectional view of a tunable liquid crystal panel according to another embodiment of the invention. Referring to FIG. 21B, the tunable liquid crystal panel 900i in this embodiment is similar to the tunable liquid crystal panel 900g or 900h in FIG. 19A or FIG. 20A, and the main difference therebetween is as follows. The tunable liquid crystal panel 900i in this embodiment includes the first electrode layer 940g and the second electrode layer 950g as those in FIG. 19A on the first substrate 910, and includes the first electrode layer 940g and the second electrode layer 950h as those in FIG. 20A on the second substrate 920. That is, the first substrate 910 side has an IPS electrode design, and the second substrate 920 side has an FFS electrode design. However, in other embodiments, both the first substrate 910 side and the second substrate 920 side may have the IPS electrode design, or both the first substrate 910 side and the second substrate 920 side may have the FFS electrode design.

In conclusion, in the tunable light projector according to the embodiment of the invention, a tunable liquid crystal panel is adopted to switch a light beam between a structured light and a flood light, so that the embodiment of the invention integrates a flood light system and a structured light system into a single system, which reduces the cost and the volume of an electronic device having structured light and flood light functions. Each of the aforementioned tunable light projectors may replace any one of the aforementioned structured light projectors in the optical sensing device to form an optical sensing device having both a flood light recognition function and a structured light recognition function. In the flood light recognition function, the sensor may sense the object and determine whether the object is a human face. In the structured light recognition function, the sensor may sense the light pattern on the object and determine whether the detected human face is the face of a user of an electronic device.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A tunable light projector comprising:
   a light source configured to emit a light beam;
   a fixed optical phase modulator disposed on a path of the light beam and configured to modulate phases of the light beam, wherein the fixed optical phase modulator comprises a DOE;
   a tunable liquid crystal panel disposed on the path of the light beam and configured to switch the light beam between a structured light and a flood light, the tunable liquid crystal panel comprising:
      a first substrate;
      a second substrate;
      a liquid crystal layer disposed between the first substrate and the second substrate;
      a first electrode layer; and
      a second electrode layer, wherein at least one of the first electrode layer and the second electrode layer is a patterned layer, and wherein the first electrode layer and the second electrode are both disposed on one of the first substrate and the second substrate, or are respectively disposed on the first substrate and the second substrate; and
   a high resistive layer adjacent to the patterned layer, wherein the high resistive layer covers the patterned layer and a portion of the high resistive layer is disposed between the patterned layer and the liquid crystal layer; and
   a driver electrically connected to the first electrode layer and the second electrode layer and configured to change a voltage difference between the first electrode layer and the second electrode layer, so as to switch the light beam between the structured light and the flood light, wherein the fixed optical phase modulator is configured to modulate the light beam to a collimated light, two voltage differences between the first electrode layer and the second electrode layer respectively switch the liquid crystal layer to two refractive index distributions so as to switch the collimated light from the fixed optical phase modulator to the structured light and the flood light, respectively.

2. The tunable light projector according to claim 1, wherein an optical spatial phase distribution of the liquid crystal layer is changed with change of the voltage difference, so as to switch the light beam between the structured light and the flood light.

3. The tunable light projector according to claim 1, wherein the liquid crystal layer comprises nematic liquid crystals, polymer dispersed liquid crystals, or polymer network liquid crystals.

4. The tunable light projector according to claim 1, wherein the patterned layer comprises a plurality of conductive micro-patterns.

5. The tunable light projector according to claim 1, wherein the conductive micro-patterns have a straight shape or a zigzag shape.

6. The tunable light projector according to claim 1, wherein the first electrode layer and the second electrode layer have an in-plane switch or fringe-field switch electrode design.

7. The tunable light projector according to claim 1, wherein the first electrode layer and the second electrode layer are two patterned layers disposed on the first substrate and the second substrate, respectively, and patterns of the two patterned layers are different.

8. The tunable light projector according to claim 1, wherein the first electrode layer and the second electrode layer are two patterned layers disposed on the first substrate and the second substrate, respectively, and patterns of the two patterned layers are the same.

9. The tunable light projector according to claim 1, wherein the patterned layer has a plurality of micro-openings having a maximum diameter less than 1 millimeter.

10. The tunable light projector according to claim 9, wherein shapes of the micro-openings comprises circles, rectangles, squares, hexagons, or a combination thereof.

11. The tunable light projector according to claim 9, wherein sizes and positions of the micro-openings are regular.

12. The tunable light projector according to claim 9, wherein sizes and positions of the micro-openings are irregular.

13. The tunable light projector according to claim 1, wherein the liquid crystal panel further comprises:
   a first alignment layer disposed between the first substrate and the liquid crystal layer; and a second alignment layer disposed between the second substrate and the liquid crystal layer.

14. The tunable light projector according to claim 13, wherein the first alignment layer and the second alignment layer are vertical alignment layers, parallel alignment layers, or a combination thereof.

15. The tunable light projector according to claim 13, wherein alignment directions of the first alignment layer and the second alignment layer have uniform spatial distribution.

16. The tunable light projector according to claim 13, wherein the first alignment layer or the second alignment layer has a plurality of alignment areas, and azimuthal angles of alignment in two adjacent alignment areas are different.

17. The tunable light projector according to claim 16, wherein a locally same alignment direction area of the first alignment layer or the second alignment layer is smaller than a spot area on the tunable liquid crystal panel irradiated by the light beam from the fixed optical phase modulator.

* * * * *